US008855103B2

(12) United States Patent
Allen et al.

(10) Patent No.: US 8,855,103 B2
(45) Date of Patent: Oct. 7, 2014

(54) PERSONAL NETWORK ACCESS CONTROL SYSTEM AND METHOD

(75) Inventors: Andrew Allen, Mundelein, IL (US); Adrian Buckley, Tracy, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 1265 days.

(21) Appl. No.: 12/016,167

(22) Filed: Jan. 17, 2008

(65) Prior Publication Data
US 2009/0185523 A1 Jul. 23, 2009

(51) Int. Cl.
H04L 12/28 (2006.01)
H04L 29/06 (2006.01)
H04L 12/46 (2006.01)

(52) U.S. Cl.
CPC .............. *H04L 63/101* (2013.01); *H04L 12/46* (2013.01); *H04L 65/1006* (2013.01)
USPC ............ 370/351; 370/328; 370/356; 709/227

(58) Field of Classification Search
None
See application file for complete search history.

(56) References Cited

U.S. PATENT DOCUMENTS

| | | | | |
|---|---|---|---|---|
| 7,155,238 | B2 * | 12/2006 | Katz | 455/456.1 |
| 7,283,516 | B1 * | 10/2007 | Ganesan et al. | 370/352 |
| 2006/0084454 | A1 * | 4/2006 | Sung et al. | 455/518 |
| 2006/0187903 | A1 * | 8/2006 | Kallio et al. | 370/352 |
| 2006/0291433 | A1 * | 12/2006 | Do et al. | 370/338 |
| 2008/0307072 | A1 * | 12/2008 | Sathish | 709/219 |
| 2009/0067411 | A1 * | 3/2009 | Heidermark et al. | 370/352 |
| 2010/0004014 | A1 * | 1/2010 | Coulombe | 455/519 |
| 2010/0095362 | A1 * | 4/2010 | Boberg et al. | 726/7 |
| 2010/0183127 | A1 * | 7/2010 | Uy et al. | 379/88.22 |
| 2010/0217877 | A1 * | 8/2010 | Willars et al. | 709/228 |

FOREIGN PATENT DOCUMENTS

| | | |
|---|---|---|
| DE | 102006018092 A1 | 10/2007 |
| WO | 0223367 A1 | 3/2002 |
| WO | 2006125474 A1 | 11/2006 |
| WO | 2007045274 A1 | 4/2007 |
| WO | 2007088638 A1 | 8/2007 |
| WO | 2007089024 A1 | 8/2007 |
| WO | 2007091699 A2 | 8/2007 |

OTHER PUBLICATIONS

3GPP TS 24.259 v0.3.0; 3rd Generation Partnership Project; Technical Specification Group Core Network and Terminals; Personal Network Management (PNM); Stage 3; Release 8; Nov. 2007; 32 pgs.
Jennings, C., et al.; Title: Session Initiation Protocol (SIP) URIs for Applications such as Voicemail and Interactive Voice Response (IVR); Network Working Group; RFC 4458; Apr. 2006; 24 pgs.

(Continued)

*Primary Examiner* — Faruk Hamza
*Assistant Examiner* — Tito Pham
(74) *Attorney, Agent, or Firm* — Conley Rose, P.C.; Maria L. Sekul; J. Robert Brown, Jr.

(57) ABSTRACT

A server is provided that includes a processor such that for a Session Initiation Protocol (SIP) request containing a Uniform Resource Identifier (URI) identifying the first device, the processor is programmed to promote adding a URI and redirecting the SIP request to a second device. The added URI used by the second device to invoke a Personal Network Management (PNM) Controller function.

10 Claims, 9 Drawing Sheets

(56) References Cited

OTHER PUBLICATIONS

Tomic, Slobodanka, et al; "SIP Meets ZigBee"; Mobile and Wireless Communications Summit; XP031132438; Jul. 1, 2007; 5 pgs.
European Search Report; EP Application No. 08153673; Feb. 26, 2009; 13 pgs.
3rd Generation Partnership Project; Technical Specification Group Core Network and Terminals; Title: Personal Network Management (PNM); Stage 3, Release 8; 3GPP TS 24.259 v0.4.0; Feb. 2008; 50 pgs.
3rd Generation Partnership Project; Technical Specification Group Core Network and Terminals; Title: IP Multimedia Call Control Protocol Based on Session Initiation Protocol (SIP) and Session Description Protocol (SDP); Stage 3, Release 8; 3GPP TS 24.229 v8.3.0; Mar. 2008; pp. 1-150 (Part 1 of 4).
3rd Generation Partnership Project; Technical Specification Group Core Network and Terminals; Title: IP Multimedia Call Control Protocol Based on Session Initiation Protocol (SIP) and Session Description Protocol (SDP); Stage 3, Release 8; 3GPP TS 24.229 v8.3.0; Mar. 2008; pp. 151-300 (Part 2 of 4).
3rd Generation Partnership Project; Technical Specification Group Core Network and Terminals; Title: IP Multimedia Call Control Protocol Based on Session Initiation Protocol (SIP) and Session Description Protocol (SDP); Stage 3, Release 8; 3GPP TS 24.229 v8.3.0; Mar. 2008; pp. 301-400 (Part 3 of 4).
3rd Generation Partnership Project; Technical Specification Group Core Network and Terminals; Title: IP Multimedia Call Control Protocol Based on Session Initiation Protocol (SIP) and Session Description Protocol (SDP); Stage 3, Release 8; 3GPP TS 24.229 v8.3.0; Mar. 2008; pp. 401-495 (Part 4 of 4).
PCT International Search Report; PCT Application No. PCT/US2009/030965; Jul. 21, 2009; 3 pgs.
PCT Written Opinion of the International Searching Authority; PCT Application No. PCT/US2009/030965; Jul. 21, 2009; 4 pgs.
3GPP TS 22.259 V8.4.0; 3rd Generation Partnership Project; Technical Specification Group Service and System Aspects; Service Requirements for Personal Network Management (PNM); Stage 1; Release 8; Dec. 2007; 27 pgs.
Kappler, Cornelia, et al.; Title: Dynamic Network Composition for Beyond 3G Networks: A 3GPP Viewpoint; IEEE Network; Jan./Feb. 2007; pp. 47-52.
Zhang, Dajiang; Title: Security Management in Personal Network; Nokia China Investment Co. Ltd.; 2006 1st International Symposium on Pervasive Computing and Applications; pp. 575-578.
EPO Examination Report; EP Application No. 08153673.2; Sep. 1, 2010; 4 pgs.
Partial European Search Report; EP Patent Application 08153673.2; Jan. 10, 2008; 7 pgs.
Brown, Alan, et al; A SIP-based OSGi Device Communication Service for Mobile Personal Area Networks; IEEE Communications Society; 2006; 7 pgs.
3GPP TS 22.259 V1.0.0; 3rd Generation Partnership Project; Technical Specification Group Service and System Aspects; Service Requirements for Personal Network Management; Stage 1; Release 7; Oct. 2005; 16 pgs.
Korean Office Action; Application No. 10-2010-7018288; Jan. 20, 2012; 8 pages.
Australian Office Action; Application No. 2009205426; Jun. 1, 2012; 2 pages.
Canadian Office Action; Application No. 2,712,487; Oct. 31, 2012; 3 pages.
Chinese Office Action; Application No. 200980105864.7; Aug. 9, 2012; 13 pages.
Japanese Office Action; Application No. 2010-543214; Aug. 22, 2012; 7 pages.
Korean Office Action; Application No. 10-2010-7018288; Jul. 27, 2012; 6 pages.
European Examination Report; Application No. 08153673.2; Apr. 25, 2013; 6 pages.
Chinese Office Action; Application No. 200980105864.7; Apr. 27, 2013; 13 pages.
European Examination Report; Application No. 08153673.2; Sep. 16, 2013; 4 pages.
Chinese Office Action; Application No. 200980105864.7; Nov. 7, 2013; 9 pages.
3GPP TS 23.003 V7.6.0; 3rd Generation Partnership Project; Technical Specification Group Core Network and Terminals; Numbering, Addressing and Identification; Release 7; Dec. 2007; 54 pages.
3GPP TS 23.259 V1.2.0; 3rd Generation Partnership Project; Technical Specification Group Services and System Aspects; Personal Network Management (PNM); Procedures and Information Flows; Stage 2; Release 8; Nov. 2007; 37 pages.
3GPP TS 24.173 V7.3.0; 3rd Generation Partnership Project; Technical Specification Group Core Network and Terminals; IMS Multimedia Telephony Communication Service and Supplementary Services; Stage 3; Release 7; Dec. 2007; 13 pages.
3GPP TS 24.228 V5.15.0; 3rd Generation Partnership Project; Technical Specification Group Core Network and Terminals; Signalling Flows for the IP Multimedia Call Control based on Session Initiation Protocol (SIP) and Session Description Protocol (SDP); Stage 3; Release 5; Sep. 2006; 851 pages.
Rosenberg, J., et al.; "SIP: Session Initiation Protocol"; RFC 3261; Jun. 2002; 252 pages.
Barnes, M.; "An Extension to the Session Initiation Protocol (SIP) for Request History Information"; RFC 4244; Nov. 2005; 44 pages.
Schulzrinne, H., et al.; "The Reason Header Field for the Session Initiation Protocol (SIP)"; RFC 3326; Dec. 2002; 8 pages.
Rosenberg, J., et al.; "Indicating User Agent Capabilities in the Session Initiation Protocol (SIP)"; RFC 3840; Aug. 2004; 36 pages.
Rosenberg, J., et al.; "Caller Preferences for the Session Initiation Protocol (SIP)"; RFC 3841; Aug. 2004; 26 pages.
Rosenberg, J.; "Applying Loose Routing to Session Initiation Protocol (SIP) User Agents (UA)"; draft-rosenberg-sip-ua-loose-route-01; Jun. 12, 2007; 20 pages.
Holmberg, C., et al.; "Target URI Delivery in the Session Initiation Protocol (SIP)"; draft-holmberg-sip-target-uri-delivery-00.txt; Jan. 11, 2008; 11 pages.
PCT International Preliminary Report on Patentablity; Application No. PCT/US2009/030965; May 3, 2010; 8 pages.
Australian Examination Report; Application No. 2009205426; Jul. 23, 2013; 3 pages.
Japanese Office Action; Application No. 2010-543214; Jun. 25, 2013; 8 pages.
Canadian Office Action; Application No. 2,712,487; Jan. 21, 2014; 3 pages. (4214-05606).
European Examination Report; Application No. 08153673.2; Apr. 3, 2014; 5 pages. (4214-05601).

\* cited by examiner

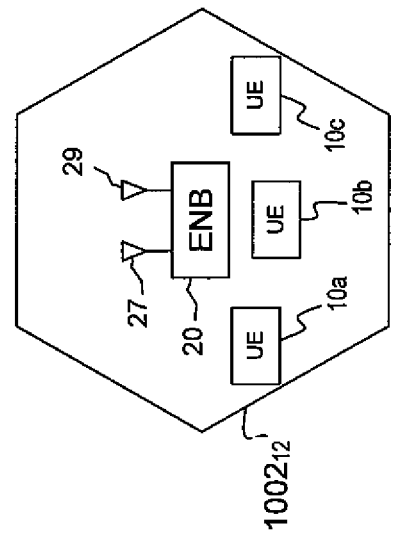
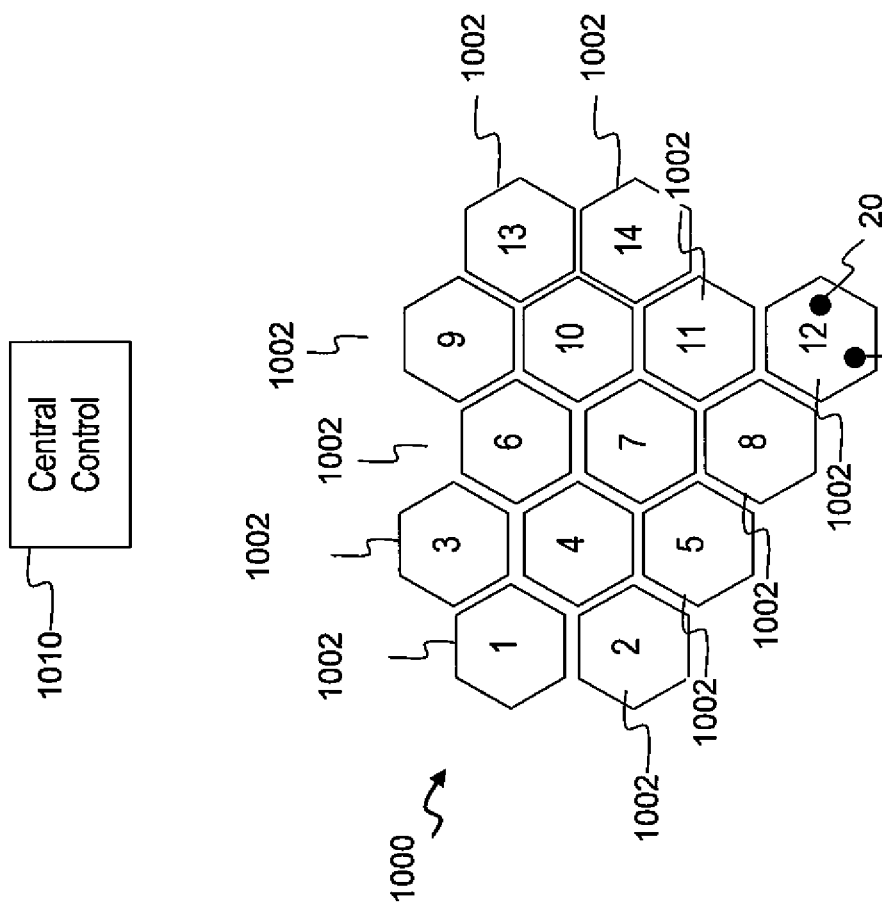

PERSONAL NETWORK ACCESS CONTROL SYSTEM AND METHOD

BACKGROUND

Traditionally, a single integrated device with integrated radio access means formed the user equipment (UE) and was used for access to mobile communication services. However, many users now possess more than one device for mobile communication services. Such devices may be connected to form a personal network (PN). The devices differ in their capabilities, and these capabilities qualify the devices more or less for specific end-to-end applications or media, such as audio, video, or pictures.

Personal network management (PNM) allows users to manage their devices and PNs. The considered management functions of PNM include the setup and configuration of PNs, the personalization for the termination of services within a PN, and the enablement of secure connections between the devices or personal network elements (PNEs).

PNM addresses the management of multiple devices or UEs belonging to a single user or subscriber. Personal UE network features enable the management of multiple UEs belonging to a single PN user. In particular, the needs of users with more than one terminal and subscription are addressed, e.g. ordinary handset for telephony, car phone, PDA for emails when the user is on the move, and a data card with laptop when the user is in a semi-stationary mode. Although such devices are mainly held for a particular usage, many are able to support more than one sort of service, e.g. telephony may be supported by several of the previously mentioned devices. However, PNEs are not aware of the presence of other PNEs belonging to a user.

PNM can apply to any calls or sessions or messages (including but not limited to telephony calls, Push to Talk Sessions, Messaging Sessions) as well as individual messages such as Instant Messages or Short Messages (SMS).

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 10 illustrates an exemplary cellular network according to an embodiment of the disclosure.

FIG. 11 depicts a detailed view of a cell within the exemplary cellular network.

DETAILED DESCRIPTION

Figure 1:
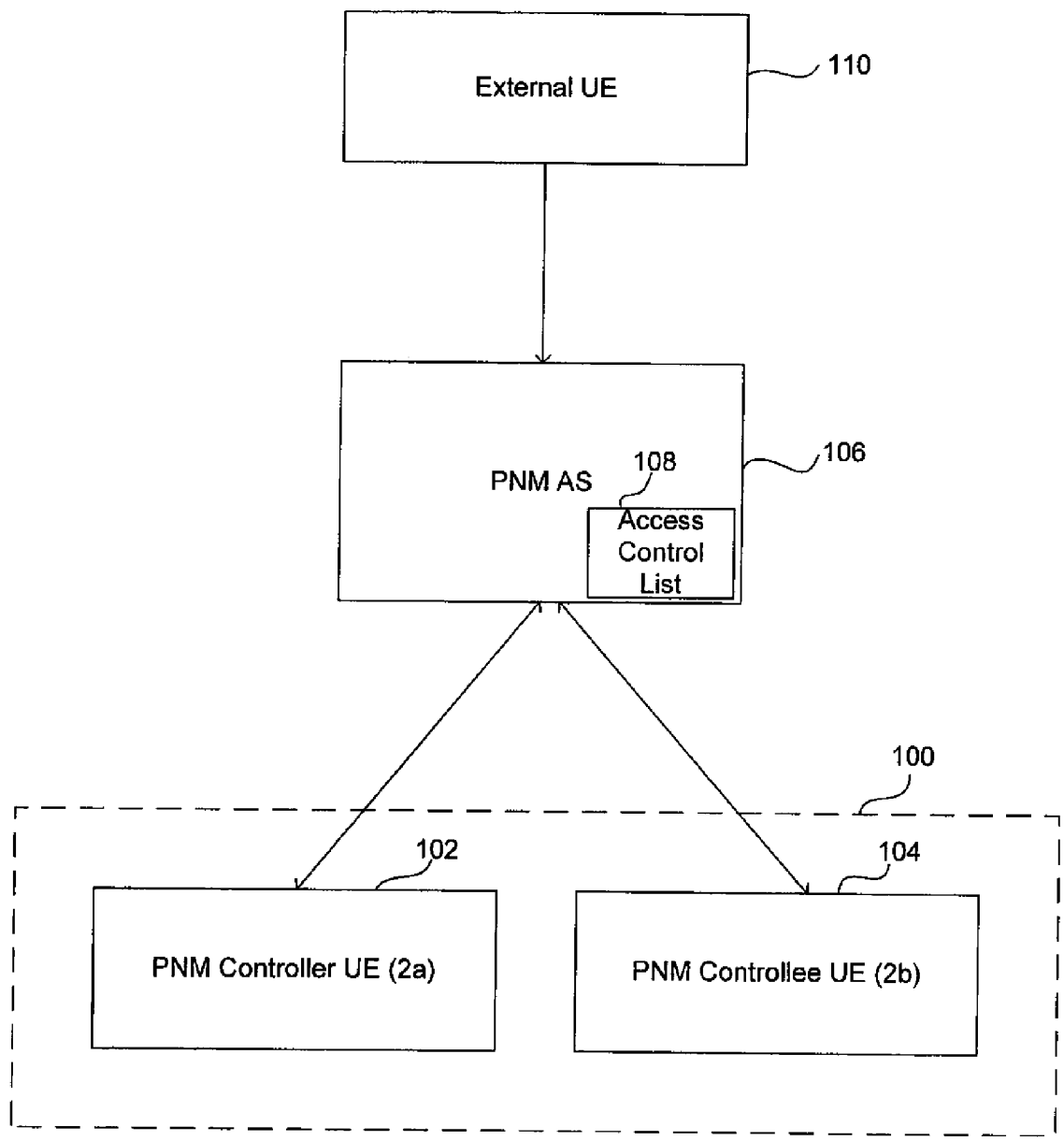
FIG. 1 illustrates a personal network with a PNM Controller UE and a PNM Controllee UE according to an embodiment of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

According to one embodiment, a server is provided that includes a processor such that for a Session Initiation Protocol (SIP) request containing a Uniform Resource Identifier (URI) identifying the first device, the processor is programmed to promote adding a URI and redirecting the SIP request to a second device. The added URI used by the second device to invoke a Personal Network Management (PNM) Controller function.

According to another embodiment, a method is provided of redirecting a Session Initiation Protocol (SIP) request. The method includes receiving a SIP request addressed to a first device, the SIP request containing a Uniform Resource Identifier (URI) identifying the first device. The method includes adding a URI to the SIP request, and redirecting the SIP request to a second device. The presence of the added URI invokes a controller function that allows the second device to identify the SIP request as a redirected SIP request for the first device.

According to other embodiments, a server is provided that includes a processor programmed to promote including in a request an identifier identifying a Personal Network Management (PNM) Controller function.

According to one embodiment, a user equipment (UE) is provided that includes a processor such that responsive to receiving a Session Initiation Protocol (SIP) request including a Uniform Resource Identifier (URI) identifying a Personal Network Management (PNM) Controller function, the processor is programmed to promote performing the PNM Controller function.

In another embodiment, a user equipment (UE) is provided that includes a processor such that responsive to receiving a Session Initiation Protocol (SIP) request including an identifier identifying a Personal Network Management (PNM) Controller function, the processor programmed to promote providing PNM Controller function.

The functionality enabled by PNs comprises PN UE redirection and PN access control. Registration, configuration, and interrogation procedures for PNM are supported via IMS capable personal network UEs via a web client or by administrative procedures.

With regard to PN UE redirection, users may not always carry all of their devices with them but still want to be reachable. Currently, management of all of the devices for the PN user includes setting forwarding options, switching on and off the devices, and providing others with multiple addresses.

With regard to PN access control, FIG. 1 illustrates a personal network (PN) 100 with a PNM Controller UE 102 and a PNM Controllee UE 104 according to an embodiment of the disclosure. For example, a family with a young child may establish the PN 100 for the family with the parent UE being the PNM Controller UE 102 and the child UE being the PNM Controllee UE 104. The PN user may additionally modify the access levels of each UE of the PN 100 to be public or private. For example, the parent or PNM Controller UE 102 is public and can receive calls (or sessions) from outside the PN 100 while the child or PNM Controllee UE 104 is private and can only receive calls (or sessions) from within the family PN 100.

A personal network management application server (PNM AS) 106 provides access control that allows the PNM Controller UE 102 to determine which UEs external to the PN 100 are allowed to become guest UEs that can contact the PNM Controllee UE 104. Thus, a parent can determine who can contact their child. The identities of external UEs that can contact the PNM Controllee UE 104 can be pre-defined by the PNM Controller UE 102 in an access control list 108 on PNM AS 106. Therefore, when the PNM Controllee UE 104 receives a call (or session) from an external UE 110 that is on the access control list 108, the PNM AS 106 passes the call (or session) on to the PNM Controllee UE 104. If the external UE 110 was not on the access control list 108, the PNM Controller UE 102 can be informed that the external UE 110 is attempting to place a call (or session) to the PNM Controllee UE 104. One way this can be accomplished is by having the PNM AS 106 redirect the incoming call (or session) for the PNM Controllee UE 104 to the PNM Controller UE 102. The PNM Controller UE 102 can then decide, such as manually by the user on a call-by-call basis, to have the PNM AS 106 redirect the call (or session or message) to the PNM Controllee UE 104 or reject the call (or session or message). The PNM Controller UE 102 can even accept the call (or session or message) and then after communicating with the caller decide whether to transfer the call (or session or message) to the PNM Controllee UE 104 or end the call (or session or message).

Figure 2:
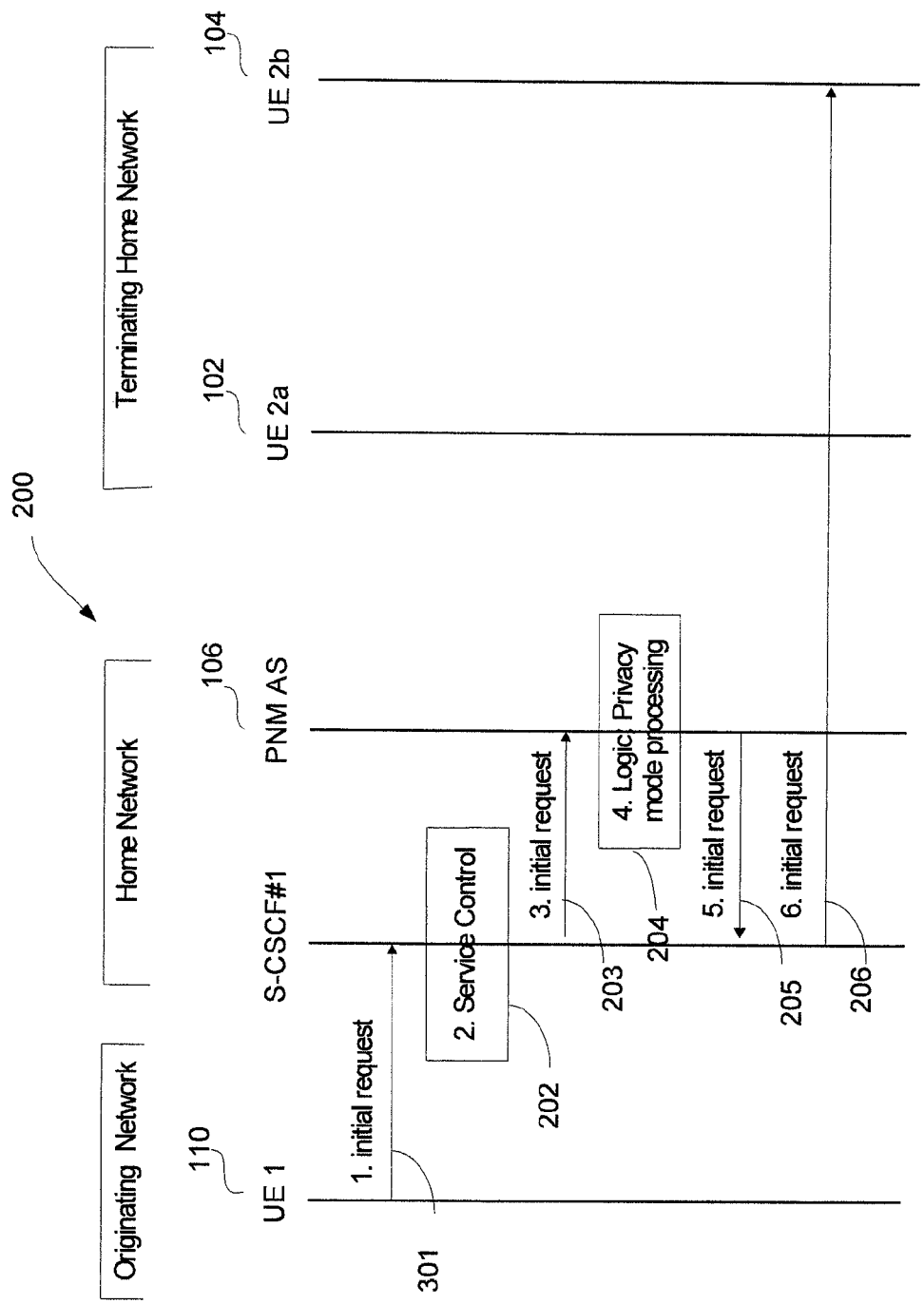
FIG. 2 illustrates a high level sequence of personal network access control according to an embodiment of the disclosure.

FIG. 2 illustrates a high level sequence 200 of personal network access control according to an embodiment of the disclosure. In FIG. 2, it is assumed that the originating UE (i.e., external UE 110) is a guest UE and is configured in the access control list 108 of the PNM Controllee UE 104. When the PNM AS 106 receives an initial request message from a Call Session Control Function (S-CSCF#1), the PNM AS 106 verifies that the external UE 110 matches an entry in the access control list 108 of the PNM Controllee UE 104 and sends the initial request message to the PNM Controllee UE 104.

At flow 201, the S-CSCF#1 receives an initial request message from the external UE 110 to the PNM Controllee UE 104. The S-CSCF#1 invokes the termination service control logic required for the PNM Controllee UE 104 and evaluates the initial filter criteria at flow 202. The S-CSCF#1 then forwards the initial request message to the PNM AS 106 at flow 203 as a result of executing the initial filter criteria. In the privacy mode processing at flow 204, the PNM AS 106 extracts the source and destination addresses from the initial request message. The PNM AS 106 confirms that the PNM Controllee UE 104 is a controllee UE. Using this as a key, PNM AS 106 then searches its database for the PN 100 of the PNM Controllee UE 104 to find if the external UE 110 is configured in the access control list 108 for the PNM Controllee UE 104. In this case, it is assumed that the external UE 110 is in the access control list 108 and is allowed to initiate sessions with or send messages to the PNM Controllee UE 104. At flow 205, the PNM AS 106 sends the initial request message to the S-CSCF#1. The S-CSCF#1 then routes the initial request message to the PNM Controllee UE 104 at flow 206.

Figure 3:
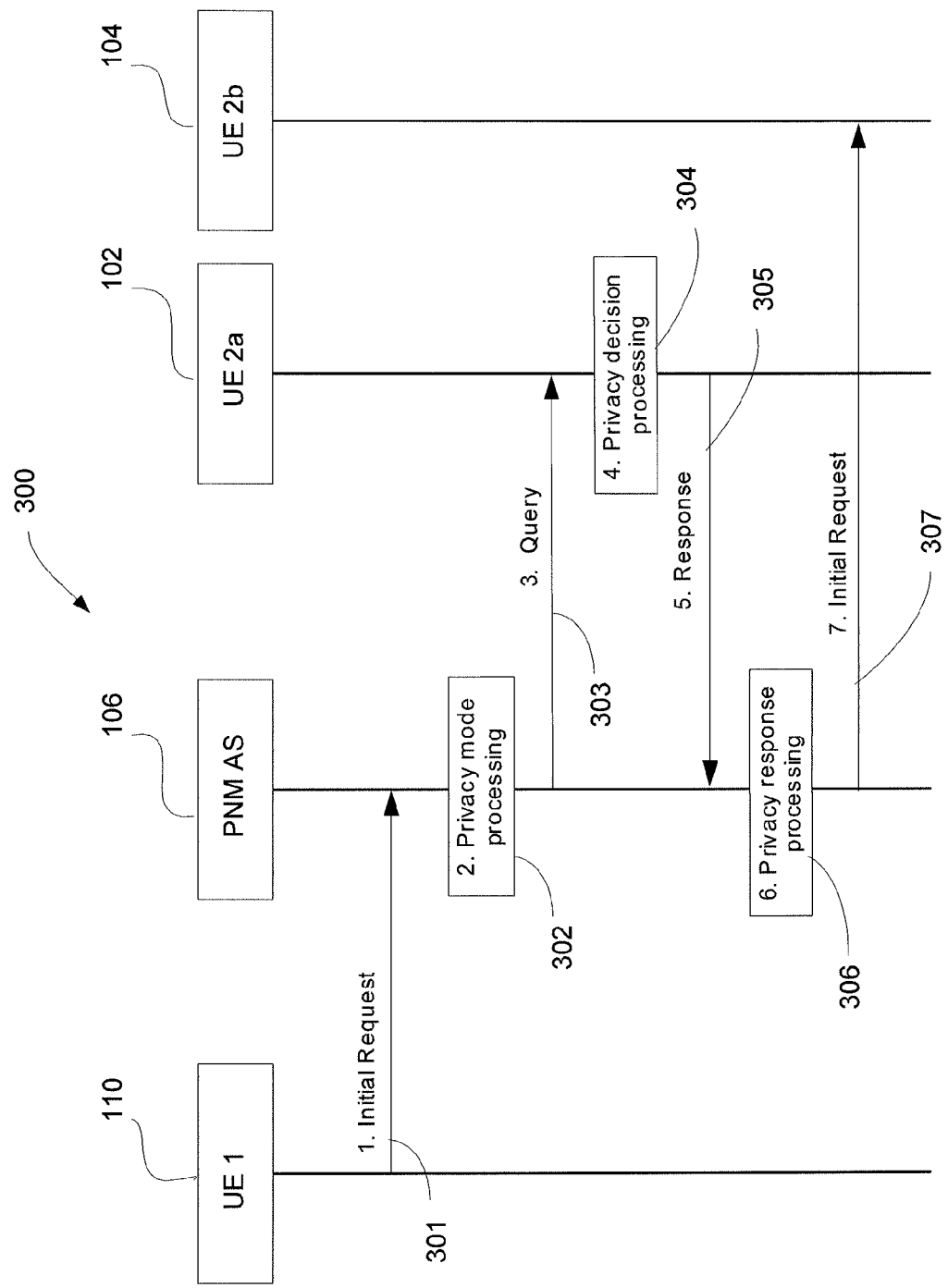
FIG. 3 illustrates another high level sequence of personal network access control according to an embodiment of the disclosure.

FIG. 3 illustrates another high level sequence 300 of personal network access control according to an embodiment of the disclosure. At flow 301, external UE 110 sends an initial request message to the PNM Controllee UE 104. The initial request message is received by the PNM AS 106, and the privacy mode processing is executed at flow 302. In this embodiment, it is assumed that the external UE 110 is not on the access control list 108. At flow 303, the PNM AS 106 queries the PNM Controller UE 102 on how to proceed with the initial request message. In the privacy decision processing flow 304, the query info is shown to the PN user of the PNM Controller UE 102. For example, the external UE 110 calling the PNM Controllee UE 104, with options for the controlling user to select: 1: Allow Controllee, 2: Deny Controllee, 3: Allow Controllee and save policy, 4: Deny Controllee and save policy, 5: Accept at Controller. The PN user of the PNM Controller UE 102 may then allow/disallow and possibly save this option for future calls. The decision whether to Allow, Deny, or Accept is sent in the response to the query. The response message is sent to the PNM AS 106 in flow 305. In the privacy response processing flow 306, the PNM AS 106 determines the action directed by the PN user of the PNM Controller UE 102. At flow 307, it is assumed that the PN user of the PNM Controller UE 102 has allowed the call to go through to the PNM Controllee UE 104, and the PNM AS 106 sends the initial request message to the PNM Controllee UE 104.

Since there exists the possibility for the PNM Controller UE 102 to accept the call (or session or message), flow 203 may be implemented using a SIP INVITE or other SIP Request such as a SIP MESSAGE and so this is maybe similar to call forwarding or Message forwarding. Therefore, there may need to be a way for the PNM Controller UE 102 to identify that this request is a PNM access control request intended for the PNM Controller application as opposed to an ordinary call or message received by the PNM Controller UE 102 or call/Message forwarding.

Accordingly, the disclosure provides a system and method by which the PNM Controller UE 102 can determine that the incoming SIP INVITE or SIP MESSAGE or other SIP Request is a redirection as a result of the PNM AS 106 redirecting a call, session, or Message for the PNM Controllee UE 104 to the PNM Controller UE 102 so that the PNM Controller UE 102 can handle the SIP INVITE or SIP MESSAGE or other SIP Request correctly.

It may be useful if the SIP INVITE or SIP MESSAGE or other SIP request conveys the following information to the PNM Controller UE 102:

1: That this request is a PNM access control request intended for the PNM Controller application;

2: The identity of the originator of the request; and

3: The identity of the PNM Controllee UE 104 to whom the request was originally addressed.

The present disclosure proposes, according to one embodiment, several techniques for these purposes such as:

1: defining a new feature tag for the PNM Controller application and include this feature tag in an Accept-Contact header in order to identify that this request is a PNM access control request intended for the PNM Controller application;

2. defining an IMS Application Reference Identifier (IARI) value for the PNM Controller application and include this in the g.3gpp.app_ref feature tag in an Accept-Contact header in order to identify that this request is a PNM access control request intended for the PNM Controller application;

3: including the P-Asserted-Identity header from the original request in order to identity of the originator of the request; and/or 4: including in the Request URI the target URI-parameter (as defined in RFC 4458) the URI of the PNM Controllee UE 104 to whom the request was originally addressed.

Other alternatives provided according to various embodiments of the present disclosure are as follows:

This identifier could be: 1) A URI that identifies the PNM Controller, 2) A New SIP URI parameter in the URI, 3) Including in the URI a Target URI parameter (defined in RFC 4458) and setting the Target parameter to have a unique URI that indicates that the PNM Controller application should be invoked. E.g.

---
INVITE sip:PN_UE1a@home1.net;target=PNM-Controller.UE-1a@home1.net

---

Including in the URI a Target URI parameter (defined in RFC 4458) and setting the Target parameter to the URI of the PNM Controllee UE that the session was originally addressed to in order to cause the PNM Controller application should be invoked. E.g.

---
INVITE sip:PN_UE1a@home1.net;target=PN_UE-1b@home1.net

---

Including in an Accept-Contact header (as per RFC 3841) a Media Feature tag that indicates PNM Controller.

Including in an Accept-Contact header a g.3gpp.app_ref feature tag containing an IMS Communication Service Identifier (ICSI) value or IMS Application Reference Identifier (IARI) value that identifies the PNM Controller should be invoked. NOTE that the PNM Controller UE will previously at registration have registered the Media Feature tag in the Contact header of the SIP REGISTER request as per RFC 3840.

A new SIP (e.g. a P-Header)

In order to enable the PNM Controller (UE-1a) to identify this as a PNM Controller related request as opposed to an ordinary call forwarding the PNM AS adds to the SIP INVITE request (in Step 14) the following identifiers: 1) A PNM Specific URI-Parameter (3GPP-pnm-cntrlr) is added to the URI of UE-1a in the Request URI and/or the URI in the To header, 2) A History-Info header is included containing a Reason header indicating this is a PNM Controller related forwarding (Reason=3GPP-PNM;cause=1, where 1 indicates PNM Controller related forwarding). The UE-1a URI in the History-Info header also may contain the PNM Specific URI-Parameter (3GPP-pnm-cntrlr), 3) An Accept-Contact header containing a feature tag that identifies the PNM Controller When PNM Controller UE-1a receives the SIP INVITE it can use the following aspects to determine that this is a PNM Controller related request as opposed to ordinary call forwarding; 1) Presence of the PNM Specific URI-Parameter (3GPP-pnm-cntrlr) is in the P-Called-Party-ID header and/or the URI in the To header, 2) Presence of a Reason header indicating this a PNM Controller related forwarding (Reason=3GPP-PNM;cause=1, where 1 indicates PNM Controller related forwarding) in the History-Info header. 3) Presence of UE-1a the PNM Specific URI-Parameter (3GPP-pnm-cntrlr) in the URI in the History-Info header. 4) Presence of an media feature tag (or parameter value of the media feature tag) in an Accept-Contact header that identifies the PNM Controller.

When PNM Controller UE-1a receives the SIP INVITE it can use the following aspects to determine that this is a PNM Controller related request as opposed to ordinary call forwarding: 1) Presence of the target URI—in the P-Called-Party-ID header containing either a URI that identifies the PNM Controller or the URI of the Controllee UE, 2) Presence of an media feature tag (or parameter value of the media feature tag) in an Accept-Contact header that identifies the PNM Controller, 3) The presence of a PNM specific URI-parameter (3GPP-pnm-cntrlr) in the Contact header that was inserted by the PNM Application Server.

While the target URI-parameter as defined in RFC 4458 was originally defined with services like voicemail and interactive voice response (IVRs), its usage is not restricted to these applications and can be used by any application that needs to know the original target.

The PNM Controller application is an application in the PNM Controller UE 102 that needs to determine the URI that the request was addressed to when it was processed by the PNM AS 106.

Another reason to use the Accept-Contact header and define an IARI value to indicate the PNM Controller application is that it is possible that the user of the PNM Controller UE 102 may have multiple UEs registered with the same public user identity and only one of them is PNM Controller capable (or PNM Controller enabled). In this situation, the request needs to be prioritized to be routed to the UE that performs the PNM Controller function. Use of the Accept-Contact header and an IARI value or some other feature tag to indicate the PNM Controller satisfies this requirement.

In one embodiment, the disclosure relates to using the following SIP responses:

1: a 302 (Moved Temporarily) response or some other 3XX response or 4xx response to allow the request to be forwarded to the PNM Controllee UE 104;

2: a 480 (Temporarily Unavailable) response or some other 4XX response to deny the request; and 3: a 200 (OK) response or some other 2xx response (such as a 202 Accepted) response) to accept the call.

If the user decides to save the policy, a PN Configuration mechanism (using XCAP) may be used to add the policy to the access control list 108.

The History-Info header is also included (as per normal call forwarding) and contains the URI that the request was addressed to when it is processed by the PNM AS 106 along with the contents of the Request-URI of the forwarded request (including the target URI-parameter).

---
History-Info: <sip:PN_UE2b@home2.net>;index=1, <sip:PN_UE2a@home2.net;target=PN_UE-2b@home2.net>;index=1.1,

---

The History-Info header from the initial request is included in the 302 (Moved Temporarily) response, and the PNM AS 106 then includes the History-Info header in the redirected request to the PNM Controllee UE 104. This provides information to the PNM Controllee UE 104 that the request was first directed to the PNM Controller application. The following example shows the information the PNM Controllee UE 104 receives in the History-Info header after the PNM Controller UE 102 has allowed the PNM Controllee UE 104 to receive the request.

History-Info: <sip:PN_UE2b@home2.net>;index=1,
   <sip:PN_UE2a@home2.net;target=PN_UE-
   2b@home2.net>;index=1.1,
   <sip:PN_UE2b@home2.net?Reason=SIP;cause=302>;index=1.2

From this information, the PNM Controllee UE 104 can tell that the request was originally addressed to it (PN_UE2b@home2.net) and was forwarded to the PNM Controller UE 102 (PN_UE2a@home2.net) with the PNM Controllee UE 104 as the target. The request was then redirected to the PNM Controllee UE 104 by the PNM Controller UE 102.

Accordingly, when the PNM AS 106 redirects the call (or session) to the PNM Controller UE 102, the PNM Controller UE 102 needs to be able to identify the call (or session or message) as a redirected call (or session or message) due to the PNM AS 106 redirecting a call (or session or message) for the PNM Controllee UE 104 to the PNM Controller UE 102. Specifically, when a SIP INVITE or other SIP Request is redirected to the PNM Controller UE 102 by the PNM AS 106, the PNM Controller UE 102 needs to be able to identify the SIP INVITE or SIP Request as a redirection due to the PNM AS 106 redirecting a call (or session or message) for the PNM Controllee UE 104 to the PNM Controller UE 102, as opposed to an ordinary call (or session or message) received by the PNM Controller 102 or call/message forwarding.

Figure 4:
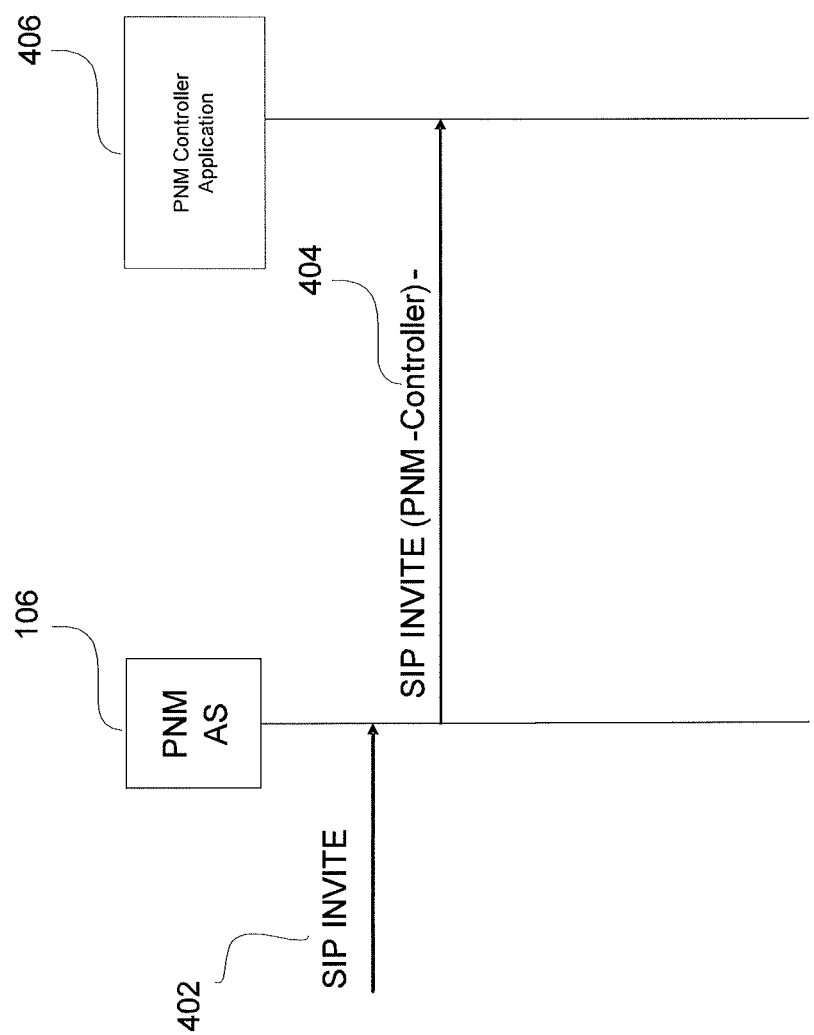
FIG. 4 illustrates a PNM Controller UE determining that a SIP INVITE has been redirected by the PNM AS according to an embodiment of the disclosure.

According to an embodiment of the disclosure as illustrated in FIG. 4, in order for the PNM Controller UE 102 to determine that a SIP INVITE 402 has been redirected by the PNM AS 106, the outgoing SIP INVITE 402 may include an identifier 404 in the SIP message that identifies that the SIP message has be redirected due to the PNM AS 106. The identifier 404 could be:

1: a URI that identifies a PNM Controller application 406;

2: a new SIP URI parameter in the URI;

3: a target URI parameter (as defined in RFC 4458) included in the URI setting, the target parameter set to a unique URI that indicates that the PNM Controller application 406 should be invoked;

a target URI parameter (as defined in RFC 4458) included in the URI setting, the Target parameter set to the URI of the PNM Controllee UE 104 that the session was originally addressed to in order to cause the PNM Controller application 406 to be invoked;

4: a Media Feature tag included in an Accept-Contact header (as per RFC 3841), the Media Feature tag indicates the PNM Controller application 406 (The PNM Controller UE 102 will have previously registered the Media Feature tag in the Contact header of the SIP REGISTER request as per RFC 3840.);

5: a g.3gpp.app_ref feature tag included in an Accept-Contact header, the g.3gpp.app_ref feature containing an IMS Communication Service Identifier (ICSI) value or an IMS Application Reference Identifier (IARI) value that identifies that the PNM Controller application 406 should be invoked; and/or 6: a new SIP header (e.g., a P-Header).

Figure 5:
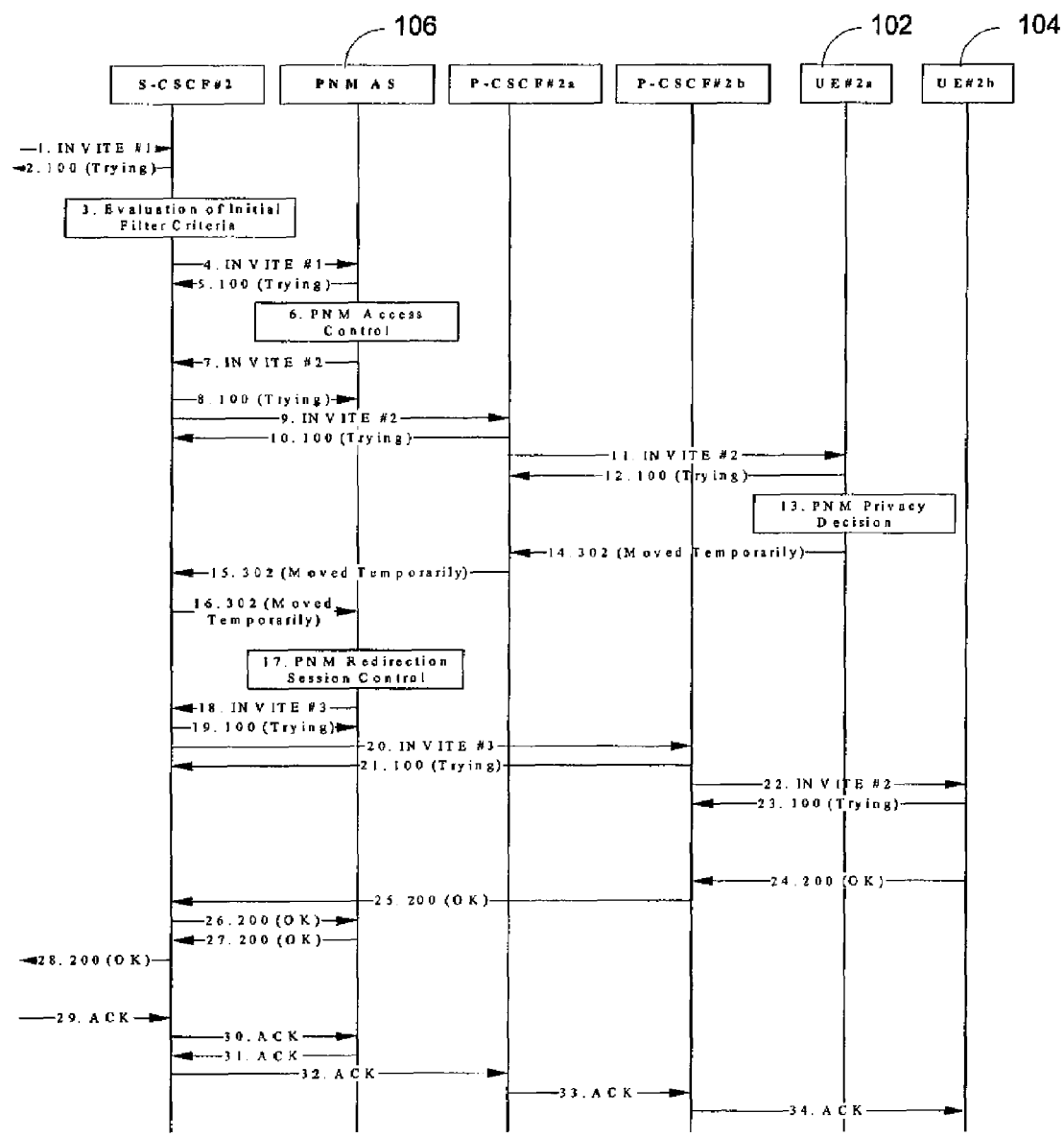
FIG. 5 illustrates signaling flows for PN access control according to an embodiment of the disclosure.

FIG. 5 illustrates signaling flows for PN access control according to an embodiment of the disclosure.

The steps prior to flow 1 are according to the standard procedures specified in TS 24.228[10].

FLOW 1. INVITE#1 (I-CSCF#2 to S-CSCF#2)

I-CSCF-2 forwards the INVITE#1 to S-CSCF#2 after invocation of location Query. An example of the INVITE#1 may be as follows:

1: SIP INVITE Request (I-CSCF#2 to S-CSCF#2)

INVITE sip:PN_UE2b@home2.net
Via:SIP/2.0/UDP icscf2.home2.net;branch=z9hG4bK871y12.1,
SIP/2.0/UDP scscf1.home1.net;branch=z9hG4bK332b23.1,
SIP/2.0/UDP pcscf1.visited1.net;branch=z9hG4bK240f34.1,
SIP/2.0/UDP [5555::aaa:bbb:ccc:ddd]:1357;comp=sigcomp;
branch=z9hG4bKnashds7
Max-Forwards: 65
Route: <sip:scscf2.home2.net;lr>
Record-Route:<sip:scscf1.home1.net;lr>,<sip:pcscf1.visited.net;lr>
P-Asserted-Identity: "John Doe" <sip:UE1@home1.net>
Privacy: none
From: <sip:UE1@home1.net>;tag=157893
To: <sip:UE2b@home2.net>
Cseq: 127 INVITE
Call-ID:131243vdse
Supported: precondition, 100rel,gruu
Accept-Contact: *;g.3gpp.app_ref="urn%3Aurn-xxx%3gpp-
service.ims.icsi.mmtel"
P-Asserted-Service: urn:urn-xxx:3gpp-service.ims.icsi.mmtel
Contact: <sip:PN_UE2b@home1.net;gr=urn:uuid:f81d4fae-7dec-11d0-
   a765-00a0c91e6bf6>
Allow: INVITE, ACK, CANCEL, BYE, PRACK, UPDATE, REFER,
MESSAGE
Content-Type: application/sdp
Content-length: (...)
SDP NOT SHOWN FLOW 2. 100 Trying S-CSCF#2 responds to the INVITE#1 request with a 100 Trying provisional response. An example of the 100 Trying provisional response may be as follows:

2: SIP 100 Trying

SIP/2.0 100 Trying
Via:SIP/2.0/UDP icscf2.home2.net;branch=z9hG4bK871y12.1,
SIP/2.0/UDP scscf1.home1.net;branch=z9hG4bK332b23.1,
SIP/2.0/UDP pcscf1.visited1.net;branch=z9hG4bK240f34.1,
SIP/2.0/UDP [5555::aaa:bbb:ccc:ddd]:1357;comp=sigcomp;
branch=z9hG4bKnashds7
From: <sip:UE1@home1.net>;tag=157893
To: <sip:UE2b@home2.net>
Cseq: 127 INVITE
Call-ID:131243vdse
Content-Length: 0

FLOW 3. Evaluation of Initial Filter Criteria

S-CSCF#2 validates the service profile of this subscriber and evaluates the initial filter criteria.

FLOW 4. INVITE#1(S-CSCF#2 to PNM AS)

S-CSCF#2 forwards the INVITE#1 request to PNM AS based upon the initial filter criteria (IFCs). An example of the resulting INVITE#1 may be as follows:

4: SIP INVITE request (S-CSCF#1 to PNM AS)

INVITE sip:PN_UE2b@home2.net
Via: SIP/2.0/UDP scscf2.home2.net;branch=z9hG4bwt871y12.1,
SIP/2.0/UDP icscf2.home2.net;branch=z9hG4bK871y12.1,
SIP/2.0/UDP scscf1.home1.net;branch=z9hG4bK332b23.1,

```
SIP/2.0/UDP pcscf1.visited1.net;branch=z9hG4bK240f34.1,
SIP/2.0/UDP [5555::aaa:bbb:ccc:ddd]:1357;comp=sigcomp;
  branch=z9hG4bKnashds7
Max-Forwards: 64
Route: <sip:pnmas.home2.net;lr>
Record-Route:
  <sip:scscf2.home1.net;lr>,<sip:scscf1.home1.net;lr>,
  <sip:pcscf1.visited.net;lr>
P-Asserted-Identity: "John Doe" <sip:UE1@home1.net>
Privacy: none
From: <sip:UE1@home1.net>;tag=157893
To: <sip:UE2b@home2.net>
Cseq: 127 INVITE
Call-ID:131243vdse
Supported: precondition,100rel,gruu
Accept-Contact: *;g.3gpp.app_ref="urn%3Aurn-
  xxx%3gpp-service.ims.icsi.mmtel"
P-Asserted-Service: urn:urn-xxx:3gpp-service.ims.icsi.mmtel
Contact: <sip:PN_UE2b@home1.net;gr=urn:uuid:f81d4fae-7dec-11d0-
  a765-00a0c91e6bf6>
Allow: INVITE, ACK, CANCEL, BYE, PRACK, UPDATE, REFER,
  MESSAGE
Content-Type: application/sdp
Content-length: (...)
SDP NOT SHOWN
```

FLOW 5. 100 Trying

The PNM AS 106 responds to the INVITE#1 request with a 100 Trying provisional response. An example of the resulting 100 Trying provisional response may be as follows:

5: SIP 100 Trying

```
SIP/2.0 100 Trying
Via: SIP/2.0/UDP scscf2.home2.net;branch=z9hG4bwt871y12.1,
SIP/2.0/UDP icscf2.home2.net;branch=z9hG4bK871y12.1,
SIP/2.0/UDP scscf1.home1.net;branch=z9hG4bK332b23.1,
SIP/2.0/UDP pcscf1.visited1.net;branch=z9hG4bK240f34.1,
SIP/2.0/UDP [5555::aaa:bbb:ccc:ddd]:1357;comp=sigcomp;
  branch=z9hG4bKnashds7
From: <sip:UE1@home1.net>;tag=157893
To: <sip:UE2b@home2.net>
Cseq: 127 INVITE
Call-ID:131243vdse
Content-Length: 0
```

FLOW 6. PNM access control

The PNM AS 106 invokes the Private network service logic. Because UE1@home1.net is not on the <PNAccessControlList> of PN_UE-2b@home2.net in this example, the PNM Controller application 406 needs to be contacted.

FLOW 7. INVITE#2 (PNM AS to S-CSCF#2)

The PNM AS 106 generates a new invite message called INVITE#2 and sends it to S-CSCF#1 in order to interact with the PNM Controller application 406. An example of the resulting INVITE#2 may be as follows:

7: SIP INVITE Request (PNM AS to S-CSCF#2)

```
INVITE sip:PN_UE2a@home2.net;target=PN_UE-2b@home2.net
Via: SIP/2.0/UDP pnmas.home2.net;branch=z9hG4bwt871y12.1
Max-Forwards: 70
Route: <sip:scscf2.home2.net;lr>
P-Asserted-Identity: "John Doe" <sip:UE1@home1.net>
Privacy: none
From: <sip:pnmas.home1.net>;tag=r3rw33
To: <sip:PN_UE2a@home2.net>
Cseq: 127 INVITE
Call-ID:131243vdse
Supported: precondition, 100rel, histinfo
Contact: <sip:pnmas.home2.net>
History-Info: <sip:PN_UE2b@home2.net>;index=1,
  <sip:PN_UE2a@home2.net;target=PN_UE-2b@home2.net>;index=1.1
Accept-Contact:*;g.3gpp.app_ref="urn%3Aurn-xxx%3A3gpp-
  application.ims.iari.PNM-Controller"
P-Asserted-Service: urn:urn-xxx:3gpp-service.ims.icsi.mmtel
Allow: INVITE, ACK, CANCEL, BYE, PRACK, UPDATE, REFER,
  MESSAGE
Content-Type: application/sdp
Content-length: (...)
SDP NOT SHOWN
```

As illustrated above, the resulting INVITE#2 provides the following information:

Request-URI: contains the URI of the PNM Controller UE (PN_UE2a@home2.net) obtained from the <PNController> element along with the target URI-parameter which contains the URI from the original Request-URI (PN_UE-2b@home2.net).

P-Asserted-Identity: contains the identity of the originator ("John Doe"<sip:UE1@home1.net>).

From: contains the SIP URI of the PNM AS 106 (sip:pnmas.home1.net).

To: contains the URI of the PNM Controller UE 102 (UE2a@home2.net).

Supported: contains the following option tags: precondition, 100rel, histinfo.

Contact: contains a SIP URI that contains the IP address or FQDN of the PNM AS 106.

History-info: contains the URIs from the original Request-URI (PN_UE-2b@home2.net) and the URI of the PNM Controller UE 102 (PN_UE2a@home2.net) along with the target parameter set to the URI of the Controllee (PN_UE-2b@home@2.net). The PNM Controller may look to the contents of the History-Info header and responsive to finding the target parameter set to the URI of the Controllee, invoke the PNM Controller function.

Accept-Contact: contains the g.3gpp.app_ref media feature tag with the IARI value "urn %3Aurn-xxx %3A3gpp-application.ims.iari.PNM-Controller".

FLOW 8. 100 Trying

S-CSCF#2 responds to the INVITE#2 request with a 100 Trying provisional response. An example of the resulting 100 Trying provisional response may be as follows:

8: SIP 100 Trying

```
SIP/2.0 100 Trying
Via: SIP/2.0/UDP pnmas.home2.net;branch=v7hG4bwt171y12.1
From: <sip:pnmas.home1.net>;tag=r3rw33
To: <sip:PN_UE2a@home2.net>
Cseq: 127 INVITE
Call-ID:131243vdse
:
Content-Length: 0
```

FLOW 9. INVITE#2 (S-CSCF#2 to P-CSCF#2a)

S-CSCF#2 forwards the INVITE#2 request to P_CSCF#2a. An example of the resulting INVITE#2 may be as follows:

9: SIP INVITE request (S-CSCF#2 to P-CSCF#2a)

---

INVITE sip:[5555::eee:fff:aaa:bbb]:8805;comp=sigcomp SIP/2.0
Via: SIP/2.0/UDP scscf2.home2.net;branch=z9hG4bwt871y12.1,
SIP/2.0/UDP pnmas.home2.net;branch=z9hG4bwt871y12.1
Max-Forwards: 69
Route: <sip:pcscf2a.visited2.net;lr>
Privacy: none
From: <sip:pnmas.home1.net>;tag=r3rw33
To: <sip:PN_UE2a@home2.net>
Cseq: 127 INVITE
Call-ID:131243vdse
Supported: precondition, 100rel, histinfo
Contact: <sip:pnmas.home2.net>
History-Info: <sip:PN_UE2b@home2.net>;index=1,
  <sip:PN_UE2a@home2.net;target=PN_UE-2b@home2.net>;index=1.1
Accept-Contact:*;g.3gpp.app_ref="urn%3Aurn-xxx%3A3gpp-application.ims.iari.PNM-Controller"
P-Asserted-Service: urn:urn-xxx:3gpp-service.ims.icsi.mmtel
Allow: INVITE, ACK, CANCEL, BYE, PRACK, UPDATE, REFER, MESSAGE
P-Called-Party-ID: <sip:PN_UE2a@home2.net;target=PN_UE-2b@home2.net>
Content-Type: application/sdp
Content-length: (...)
SDP NOT SHOWN

---

10. 100 Trying

P-CSCF#2a responds to the INVITE#2 request with a 100 Trying provisional response. An example of the resulting 100 Trying provisional response may be as follows:

10: SIP 100 Trying

---

SIP/2.0 100 Trying
Via: SIP/2.0/UDP scscf2.home2.net;branch=z9hG4bwt871y12.1,
SIP/2.0/UDP pnmas.home2.net;branch=z9hG4bwt871y12.1
From: <sip:pnmas.home1.net>;tag=r3rw33
To: <sip:PN_UE2a@home2.net>
Cseq: 127 INVITE
Content-Length: 0

---

FLOW 11. INVITE #2 (P-CSCF#2a to UE-2a)

P-CSCF#2a sends the INVITE#2 to UE-2a (PNM Controller UE 102). An example of the resulting INVITE#2 may be as follows:

11: SIP INVITE request (P-CSCF#2a to UE-2a)

---

INVITE sip:[5555::eee:fff:aaa:bbb]:8805;comp=sigcomp SIP/2.0
Via: SIP/2.0/UDP pcscf2a.visited2.net;branch=z9hG4bK240f34.1,
SIP/2.0/UDP scscf2.home2.net;branch=z9hG4bwt871y12.1,
SIP/2.0/UDP pnmas.home1.net;branch=k9hG4bwt871y12.1
Max-Forwards: 68
Record-Route: <sip:pcscf2a.visited2.net;lr>,
<sip:scscf2.home2.net;lr>
Privacy: none
From: <sip:pnmas.home1.net>;tag=r3rw33
To: <sip:PN_UE2a@home2.net>
Cseq: 127 INVITE
Call-ID:131243vdse
Supported: precondition, 100rel, histinfo
Contact: <sip:pnmas.home2.net>
History-Info: <sip:PN_UE2b@home2.net>;index=1,
  <sip:PN_UE2a@home2.net;target=PN_UE-2b@home2.net>;index=1.1
Accept-Contact:*;g.3gpp.app_ref="urn%3Aurn-xxx%3A3gpp-application.ims.iari.PNM-Controller"
P-Asserted-Service: urn:urn-xxx:3gpp-service.ims.icsi.mmtel
Allow: INVITE, ACK, CANCEL, BYE, PRACK, UPDATE, REFER, MESSAGE
P-Called-Party-ID: <sip:PN_UE2a@home2.net;target=PN_UE-2b@home2.net>
Content-Type: application/sdp
Content-length: (...)
SDP NOT SHOWN

---

FLOW 12. 100 Trying

UE-2a responds to the INVITE#2 request with a 100 Trying provisional response. An example of the resulting 100 Trying provisional response may be as follows:

12: SIP 100 Trying

---

SIP/2.0 100 Trying
Via:SIP/2.0/UDP scscf2.home2.net;branch=z9hG4bwt871y12.1,
SIP/2.0/UDP pnmas.home2.net;branch=v7hG4bwt171y12.1
From: <sip:pnmas.home1.net>;tag=r3rw33
To: <sip:PN_UE2a@home2.net>
Cseq: 127 INVITE
Call-ID:131243vdse
Content-Length: 0

---

FLOW 13. PNM Privacy Decision

Based upon the IARI value PNM Controller UE 102 invokes the PNM Controller application 406. The PN Controller application 406 provides the originator's identity from the P-Asserted-Identity header, the PNM Controllee UE 104 identity from the target URI-parameter in the Request-URI, and the option for the user to:

1: forward the session to the PNM Controllee UE 104;

2: reject the session; and/or

3: accept the session.

In the example that follows, the user determines to forward the call (or session) to the PNM Controllee UE 104.

FLOW 14. 302 Moved Temporarily

The PNM Controllee UE 104 sends a SIP 302 Moved Temporarily response to pcscf2a.visited2.net. An example of the SIP 302 Moved Temporarily response at this flow may be as follows:

14; SIP 302 Moved Temporarily

---

SIP/2.0 302 Moved Temporarily
Via: SIP/2.0/UDP pcscf2.visited2.net;branch=z9hG4bK240f34.1,
SIP/2.0/UDP scscf2.home2.net;branch=z9hG4bwt871y12.1,
SIP/2.0/UDP pnmas.home2.net;branch=k9hG4bwt871y12.1
From: <sip:pnmas.home1.net>;tag=r3rw33
To: <sip:PN_UE2a@home2.net>;tag=wd689
Cseq: 127 INVITE
Call-ID:131243vdse
History-Info: <sip:PN_UE2b@home2.net>;index=1,
  <sip:PN_UE2a@home2.net;target=PN_UE-2b@home2.net>;index=1.1
Contact: <sip:PN_UE2b@home2.net>
Content-Length:0

As illustrated above, the SIP 302 Moved Temporarily response provides the following information:

Contact: provides a URI that contains the address of the PNM Controllee UE 104 (PN_UE-2b@home2.net).

History-info: contains the URIs from the History-Info header in the original INVITE (PN_UE-2b@home2.net and PN_UE2a@home2. net;target=PN_UE-2b@home2.net). The PNM Controller may look to the contents of the History-Info header and responsive to finding the target parameter set to the URI of the Controllee, invoke the PNM Controller function . . . .

15. 302 Moved Temporarily

The P-CSCF#2a forwards the 302 Moved Temporarily response to the S-CSCF#2. An example of the forwarded 302 Moved Temporarily response may be as follows:

15: SIP 302 Moved Temporarily

---

SIP/2.0 200 OK
Via: SIP/2.0/UDP scscf2.home2.net;branch=z9hG4bwt871y12.1,
SIP/2.0/UDP pnmas.home2.net;branch=k9hG4bwt871y12.1
From: <sip:pnmas.home1.net>;tag=r3rw33
To: <sip:PN_UE2a@home2.net>;tag=wd689
Cseq: 127 INVITE
Call-ID:131243vdse
History-Info: <sip:PN_UE2b@home2.net>;index=1,
    <sip:PN_UE2a@home2.net;target=PN_UE-2b@home2.-net>;index=1.1
Contact: <sip:PN_UE2b@home2.net>
Content-Length:0

---

FLOW 16. 302 Moved Temporarily

The S-CSCF#2 forwards the 200 OK to the PNM AS 106. An example of the forwarded 302 Moved Temporarily response at this flow may be as follows:

16: SIP 302 Moved Temporarily

---

SIP/2.0 200 OK
Via: SIP/2.0/UDP pnmas.home2.net;branch=k9hG4bwt871y12.1
From: <sip:pnmas.home1.net>;tag=r3rw33
To: <sip:PN_UE2a@home2.net>;tag=wd689
Cseq: 127 INVITE
Call-ID:131243vdse
History-Info: <sip:PN_UE2b@home2.net>;index=1,
    <sip:PN_UE2a@home2.net;target=PN_UE-2b@home2.net>;index=1.1
Contact: <sip:PN_UE2b@home2.net>
Content-Length:0

---

FLOW 17. PNM Redirection Session Control

Upon receiving the 302 Moved Temporarily response from the PNM Controller UE 102, the PNM AS 106 determines that the session is to be redirected to the PNM Controllee UE 104.

FLOW 18. INVITE#3 (PNM AS to S-CSCF#2)

The PNM AS 106 forwards the originating INVITE message to the S-CSCF#2. An example of the INVITE message at this flow may be as follows:

18: SIP INVITE request (PNM AS to S-CSCF#2)

---

INVITE sip:PN_UE2b@home2.net
Via:SIP/2.0/UDP pnmas.home2.net;branch=z9hG4bwt871y12.1
SIP/2.0/UDP scscf2.home2.net;branch=z9hG4bwt871y12.1,
SIP/2.0/UDP icscf2.home2.net;branch=z9hG4bK871y12.1,
SIP/2.0/UDP scscf1.home1.net;branch=z9hG4bK332b23.1,
SIP/2.0/UDP pcscf1.visited1.net;branch=z9hG4bK240f34.1,
SIP/2.0/UDP [5555::aaa:bbb:ccc:ddd]:1357;comp=sigcomp;branch=z9hG4bKnashds7
Max-Forwards: 63
Route: <sip:scscf2.home2.net;lr>
Record-Route:
    <sip:scscf2.home1.net;lr>,<sip:scscf1.home1.net;lr>,<sip:pcscf1.visited.net;lr>
P-Asserted-Identity: "John Doe" <sip:UE1@home1.net>
Privacy: none
From: <sip:UE1@home1.net>;tag=157893
To: <sip:UE2b@home2.net>
Cseq: 127 INVITE
Call-ID:131243vdse
Supported: precondition, 100rel, histinfo
Contact: <sip:PN_UE2b@home1.net;gr=urn:uuid:f81d4fae-7dec-11d0-a765-
    00a0c91e6bf6>
History-Into: <sip:PN_UE2b@home2.net>;index=1,
    <sip:PN_UE2a@home2.net;target=PN_UE-2b@home2.net>;index=1.1,
    <sip:PN_UE2b@home2.net?Reason=SIP;cause=302>;index=1.2
Accept-Contact: *;g.3gpp.app_ref="urn%3Aurn-xxx%3gpp-service.ims.icsi.mmtel"
P-Asserted-Service: urn:urn-xxx:3gpp-service.ims.icsi.mmtel
Allow: INVITE, ACK, CANCEL, BYE, PRACK, UPDATE, REFER, MESSAGE
Content-Type: application/sdp
Content-length: (...)
SDP NOT SHOWN As illustrated above, the INVITE message to the S-CSCF#2 provides the following information:

Request-URI: contains the URI of the PNM Controller UE 102 (PN_UE2a@home2.net) obtained from the Contact header in the 302 Moved Temporarily) response.

P-Asserted-Identity: contains the identity of the originator ("John Doe"<sip:UE1@home1.net>).

From: contains the SIP URI of the Originating UE (sip: UE1@home1.net).

To: contains the URI of the PNM Controller UE 102 (UE2a@home2.net).

Supported: contains the following option tags: precondition, 100rel, histinfo

Contact: contains the URI from the Contact header in the original INVITE (<sip:PN_UE2b@home1.net;gr=urn:uuid: f81d4fae-7dec-11d0-a765-00a0c91e6bf6>).

History-info: contains the URIs from the History-info header in the 302 Moved Temporarily response (PN_UE-2b@home2.net and PN_UE2a@home2.net; target=PN_UE-2b@home2.net) with the addition of the URI of the PNM Controllee UE 104 (PN_UE-2b@home2.net) from the Contact header in the 302 Moved Temporarily response along with the reason code "302".

Accept-Contact: contains the contents of the Accept-Contact header in the original INVITE (*;g.3gpp.app_ref="urn %3Aurn-xxx %3gpp-service.ims.icsi.mmtel").

Flows 19-34 follow the standard session establishment procedures specified in TS 24.229[10].

Alternatively, in order to enable the PNM Controller UE 102 to identify the SIP INVITE request as a PNM Controller application 406 related request as opposed to an ordinary call or session or message and call/message forwarding, the PNM AS 106 may add identifiers to the SIP INVITE or other SIP request. According to an embodiment of the disclosure, the resulting SIP INVITE may be as follows:

SIP INVITE Request (PNM AS to S-CSCF#2)

---

INVITE sip:PN_UE2a@home1.net;3gpp-pnm-cntrlr
Via: SIP/2.0/UDP pnmas.home1.net;branch=z9hG4bwt871y12.1
Max-Forwards: 70
Route: <sip:scscf1.home1.net;lr>
P-Asserted-Identity: "John Doe" <sip:UE1@home1.net>
Privacy: none
From: <sip:pnmas.home1.net>;tag=r3rw33
To: <sip:UE2a@home1.net;3gpp-pnm-cntrlr>
Cseq: 127 INVITE
Call-ID:131243vdse
Supported: precondition, 100rel, histinfo
History-Info: <sip:PN_UE2b@home1.net>;index=1,
    <sip:PN_UE2a@home1.net;3gpp-pnm-cntrlr?Reason=3GPP-PNM;cause=1>;index=1.1
Accept-Contact: *; g.3gpp.app_ref="urn%3Aurn-xxx%3A3gpp-application.ims.iari.PNM-Controller"
Contact: <sip:pnmas.home1.net;3gpp-pnm-cntrlr>
Allow: INVITE, ACK, CANCEL, BYE, PRACK, UPDATE, REFER, MESSAGE
Content-Type: application/sdp
Content-length: (...)
SDP NOT SHOWN

---

The identifiers in the above example maybe:

1: a PNM specific URI-parameter (3GPP-pnm-cntrlr) added to the URI of the PNM Controller UE 102 in the Request URI and/or a PNM specific URI-parameter (3GPP-pnm-cntrlr) added to the URI in the To header;

2: a Reason header in a History-Info header, the Reason header indicating that this is a PNM Controller application 406 related forwarding (Reason=3GPP-PNM;cause=1, where 1 indicates PNM Controller application 406 related forwarding). The PNM Controller UE 102 URI in the History-Info header also may contain a PNM specific URI-parameter (3GPP-pnm-cntrlr); and 3: a media feature tag (g.3gpp.app_ref="urn %3Aurn-xxx %3A3gpp-application.ims.iari.PNM-Controller) in the Accept-Contact header, the media feature tag identifies the PNM Controller application 406.

When the S-CSCF#2 receives the above SIP INVITE request, the S-CSCF#2 will copy the Request-URI containing the URI of the PNM Controller UE 102 into the P-Called-Party-ID header and rewrite the Request-URI to the registered Contact address of the PNM Controller UE 102.

While P-Called-Party-ID header is one embodiment, the Request-URI may not always be copied into the P-Called-Party-ID header. Proposals exist to change this behavior and it is possible in the future that the Request-URI may not be overwritten by the Contact (as proposed in draft-rosenberg-sip-ua-loose-route-01) or a new header other than the P-Called-Party-ID header may be used (e.g the target header proposed in draft-holmberg-sip-target-uri-delivery-00) to transport the original Request-URI. Alternatively, the target URI-parameter may be used to transport the original Request-URI. The PNM Controller would then obtain the Request-URI contents using these means.

According to an embodiment of the disclosure, the resulting the SIP INVITE request may be as follows:

Alternative SIP INVITE Request (P-CSCF#2 to UE-2a)

---

INVITE sip:[5555::eee:fff:aaa:bbb]:8805;comp=sigcomp SIP/2.0
Via: SIP/2.0/UDP scscf1.home1.net;branch=z9hG4bwt871y12.1
Via: SIP/2.0/UDP pnmas.home1.net;branch=k9hG4bwt871y12.1
Max-Forwards: 68
Record-Route: <sip:scscf1.home1.net;lr>,<sip:pcscf1.visited1.net;lr>
P-Asserted-Identity: "John Doe" <sip:UE1@home1.net>
Privacy: none
From: <sip:pnmas.home1.net>; tag=r3rw33
To: <sip:UE2a@home1.net;3gpp-pnm-cntrlr>
Cseq: 127 INVITE
Call-ID: 131243vdse
Supported: precondition, 100rel, histinfo
History-Info: <sip:PN_UE2b@home1.net>;index=1,
    <sip:PN_UE2a@home1.net;3gpp-pnm-cntrlr?Reason=3GPP-PNM;cause=1>;index=1.1
Accept-Contact: *; g.3gpp.app_ref="urn%3Aurn-xxx%3A3gpp-application.ims.iari.PNM-Controller"
Contact: <sip:pnmas.home1.net;3gpp-pnm-cntrlr>
Allow: INVITE, ACK, CANCEL, BYE, PRACK, UPDATE, REFER, MESSAGE
P-Called-Party-ID: <sip:PN_UE2a@home1.net;3gpp-pnm-cntrlr>
Content-Type: application/sdp
Content-length: (...)
SDP NOT SHOWN

---

When the PNM Controller UE 102 receives the above SIP INVITE request, the PNM Controller UE 102 can use the following aspects to determine that this is a PNM Controller application 406 related request as opposed to an ordinary call or call forwarding:

1: the presence of a PNM specific URI-parameter (3GPP-pnm-cntrlr) in the P-Called-Party-ID header and/or the PNM specific URI-parameter (3GPP-pnm-cntrlr) added to the To header;

2: the presence of the Reason header indicating that this is a PNM Controller application 406 related forwarding (Reason=3GPP-PNM;cause=1, where 1 indicates the PNM Controller application 406 related forwarding) in the History-Info header;

3. the presence of the PNM specific URI-parameter (3GPP-pnm-cntrlr) in the URI in the History-Info header; and/or 4: the presence of a media feature tag (or parameter value of the media feature tag g.3gpp.app_ref="urn %3Aurn-xxx %3A3gpp-application.ims.iari.PNM-Controller) in the Accept-Contact header that identifies the PNM Controller application 406.

5: The presence in the Contact header of a PNM specific URI-parameter (3GPP-pnm-cntrlr), which may be added by the PNM Application Server.

Alternatively, the target URI parameter mechanism maybe used. In this embodiment, the PNM AS 106 adds a target URI parameter to the SIP INVITE request. According to an embodiment of the disclosure, the resulting SIP INVITE may be as follows:

Alternative SIP INVITE Request (PNM AS to S-CSCF#2)

---

INVITE sip:PN_UE2a@home1.net;target=PN_UE-2b@home1.net
Via: SIP/2.0/UDP pnmas.home1.net;branch=z9hG4bwt871y12.1
Max-Forwards: 70
Route: <sip:scscf1.home1.net;lr>
P-Asserted-Identity: "John Doe" <sip:UE1@home1.net>
Privacy: none
From: <sip:pnmas.home1.net>;tag=r3rw33
To: <sip:UE2a@home1.net;3gpp-pnm-cntrlr>
Cseq: 127 INVITE
Call-ID:131243vdse
Supported: precondition, 100rel, histinfo
History-Info: <sip:PN_UE2b@home1.net>;index=1,
   <sip:PN_UE2a@home1.net;3gpp-pnm-cntrlr?Reason=3GPP-PNM;cause=1>;index=1.1
Accept-Contact: *; g.3gpp.app_ref="urn%3Aurn-xxx%3A3gpp-application.ims.iari.PNM-Controller
Contact: <sip:pnmas.home1.net;3gpp-pnm-cntrlr>
Allow: INVITE, ACK, CANCEL, BYE, PRACK, UPDATE, REFER, MESSAGE
Content-Type: application/sdp
Content-length: (...)
SDP NOT SHOWN

---

When the S-CSCF#2 receives the above SIP INVITE request, the S-CSCF#2 will copy the Request-URI containing the URI of the PNM Controller UE 102 into the P-Called-Party-ID header and rewrite the Request-URI to the registered Contact address of the PNM Controller UE 102, According to an embodiment of the disclosure, the resulting the SIP INVITE request may be as follows:
Alternative SIP INVITE request (P-CSCF#2 to UE-2a)

---

INVITE sip:[5555::eee:fff:aaa:bbb]:8805;comp=sigcomp SIP/2.0
Via: SIP/2.0/UDP scscf1.home1.net;branch=z9hG4bwt871y12.1
Via: SIP/2.0/UDP pnmas.home1.net;branch=k9hG4bwt871y12.1
Max-Forwards: 68
Record-Route: <sip:scscf1.home1.net;lr>,<sip:pcscf1.visited1.net;lr>
P-Asserted-Identity: "John Doe" <sip:UE1@home1.net>
Privacy: none
From: <sip:pnmas.home1.net>; tag=r3rw33
To: <sip:UE2a@home1.net;3gpp-pnm-cntrlr>
Cseq: 127 INVITE
Call-ID: 131243vdse
Supported: precondition, 100rel, histinfo
History-Info: <sip:PN_UE2b@home1.net>;index=1,
   <sip:PN_UE2a@home1.net;3gpp-pnm-cntrlr?Reason=3GPP-PNM;cause=1>;index=1.1
Accept-Contact: *; g.3gpp.app_ref="urn%3Aurn-xxx%3A3gpp-application.ims.iari.PNM-Controller
Contact: <sip:pnmas.home1.net;3gpp-pnm-cntrlr >
Allow: INVITE, ACK, CANCEL, BYE, PRACK, UPDATE, REFER, MESSAGE
P-Called-Party-ID: <sip:PN_UE2a@home1.-net;target=PN_UE-2b@home1.net>
Content-Type: application/sdp
Content-length: (...)
SDP NOT SHOWN

---

When the PNM Controller UE 102 receives the above SIP INVITE request, the PNM Controller UE 102 can use the following aspects to determine that this is a PNM Controller application 406 related request as opposed to an ordinary call or call forwarding:

1: the presence of the target URI parameter in the P-Called-Party-ID header containing either a URI that identifies the PNM Controller application or the URI of the PNM Controllee UE 104. In this example, the target URI parameter contains the URI of the PNM Controllee UE 104 (PN_UE-2b@home1.net); or 2: the presence of the media feature tag (or parameter value of the media feature tag, e.g g.3gpp.app_ref="urn %3Aurn-xxx %3A3gpp-application.ims.iari.PNM-Controller Contact: <sip:pnmas.home1.net>) in the Accept-Contact header that identifies the PNM Controller application 406.

An alternative to using a PNM specific URI-parameter to identify the PNM Controller application 406 is to use a PNM Controller specific URI. This URI can be either explicitly or implicitly registered by the PNM Controller UE 102. In this embodiment, the PNM Controller specific URI (e.g., PNM-Controller-UE2a@home1.net) can be used where the PNM Controller UE 102 URI (PN_UE-2a@home1.net) along with the PNM specific URI-parameter (3GPP-pnm-cntrlr) is used in the previous figures.

Another possibility is that a new SIP header could be used to convey and indication that this is a PNM Controller application 406 related request.

Once the PNM Controller UE 102 has received the SIP INVITE and identified that the SIP INVITE is a PNM Controller application 406 related request, the PNM Controller application 406 will alert the user and indicate to the user the identity of the caller (based on the P-Asserted-Identity header contents) and the identity of the PNM Controllee UE 104 (from the History-info header). The user of the PNM Controller UE 102 can then decide to:

1: accept the call (or session or message) themselves (return a SIP 200 OK response or a 2XX response);

2: redirect the call (or session or message) to the PNM Controllee UE 104 (or return a SIP 302 or 3XX or 4XX response); or 3: reject the call (or session or message) (return a SIP 4xx Response).

If the user decides to redirect the call (or session or message) to the PNM Controllee UE 104, the PNM Controller UE 102 responds with a SIP 302 Moved Temporarily response. In an embodiment of the disclosure, the SIP 302 Moved Temporarily response may be as follows:

SIP 302 Moved Temporarily

---

SIP/2.0 302 Moved Temporarily
   Via:SIP/2.0/UDP scscf1.home1.net;branch=z9hG4bwt871y12.1
   Via:SIP/2.0/UDP pnmas.home1.net;branch=v7hG4bwt171y12.1
   From: <sip:pnmas.home1.net>;tag=r3rw33
   To: <sip:UE2a@home1.net;3gpp-pnm-cntrlr>;tag=314159
   Call-ID: 131243vdse
   CSeq: 127 INVITE

```
History-Info: <sip:PN_UE2b@home1.net>;index=1,
    <sip:PN_UE2a@home1.net;3gpp-pnm-cntrlr?Reason=3GPP-
    PNM;cause=1>;index=1.1
Contact: <sip:PN_UE2b@home1.net>
Content-Length:0
```

The above SIP 302 Moved Temporarily response includes:

1: a Contact header containing the URI of the PNM Controllee UE 104; and

2: a History-Info header containing the Reason header indicating that this is a PNM Controller application 406 related forwarding and the PNM specific URI-parameter (3GPP-pnm-cntrlr).

When the PNM AS 106 receives the above SIP 302 Moved Temporarily response, the PNM AS 106 redirects the SIP INVITE request to the PNM Controllee UE 104 based on the URI in the Contact header. According to an embodiment of the disclosure, the resulting the SIP INVITE request may be as follows:

SIP INVITE Request (PNM AS to S-CSCF#2)

```
INVITE sip:PN_UE2b@home1.net
Via: SIP/2.0/UDP pnmas.home1.net;branch=z9hG4bwt871y12.1
Max-Forwards: 70
Route: <sip:scscf1.home1.net;lr>
P-Asserted-Identity: "John Doe" <sip:UE1@home1.net>
Privacy: none
From: <sip:pnmas.home1.net>;tag=734756
To: <sip:UE2b@home1.net>
Cseq: 127 INVITE
Call-ID:131243vdse
Supported: precondition, 100rel, histinfo
History-Info: <sip:PN_UE2b@home1.net>;index=1,
    <sip:PN_UE2a@home1.net;3gpp-pnm-cntrlr?Reason=3GPP-
    PNM;cause=1>;index=1.1,
    <sip:PN_UE2b@home1.-
    net?Reason=SIP;cause=302;3gpp-pnm-cntrlr>;index=1.2
Contact: <sip:pnmas.home1.net>
Allow: INVITE, ACK, CANCEL, BYE, PRACK, UPDATE, REFER,
MESSAGE
Content-Type: application/sdp
Content-length: (...)
```

The History-Info header is included with the contents of the History-Info from the SIP 302 Moved Temporarily response with the URI of the PNM Controllee UE 104 added along with the reason code 1204 (Cause 302).

According to an embodiment of the disclosure, when the S-CSCF receives the above SIP INVITE request, the S-CSCF will copy the Request-URI containing the URI of the PNM Controllee UE 104 into the P-Called-Party-ID header and rewrite the Request-URI to the registered Contact address of the PNM Controllee UE 104. In an embodiment of the disclosure, the resulting request may be as follows:

SIP INVITE Request (P-CSCF#2 to UE-2a)

```
INVITE sip:[5555::eee:fff:aaa:bbb]:8805;comp=sigcomp SIP/2.0
Via: SIP/2.0/UDP scscf1.home1.net;branch=z9hG4bwt871y12.1
Via: SIP/2.0/UDP pnmas.home1.net;branch=k9hG4bwt871y12.1
Max-Forwards: 68
Record-Route: <sip:scscf1.home1.net;lr>,<sip:pcscf1.visited1.net;lr>
P-Asserted-Identity: "John Doe" <sip:UE1@home1.net>
Privacy: none
From: <sip:pnmas.home1.net>; tag=r3rw33
To: <sip:UE2b@home1.net>
Cseq: 127 INVITE
Call-ID: 131243vdse
Supported: precondition, 100rel, histinfo
History-Info: <sip:PN_UE2b@home1.net>;index=1,
    <sip:PN_UE2a@home1.net;3gpp-pnm-cntrlr?Reason=3GPP-
    PNM;cause=1>;index=1.1,
    <sip:PN_UE2a@home1.-
    net?Reason=SIP;cause=302;3gpp-pnm-cntrlr>;index=1.2
Contact: <sip:pnmas.home1.net>
Allow: INVITE, ACK, CANCEL, BYE, PRACK, UPDATE, REFER,
MESSAGE
P-Called-Party-ID: <sip:PN_UE1b@home1.net>
Content-Type: application/sdp
Content-length: (...)
```

The PNM Controllee UE 104 is then able to accept the call (or session or message) with a SIP 200 OK response.

In the case that the PNM Controller application 406 accepts the call (or session or message) and then decides to transfer the call (or session) to the PNM Controllee UE 104, the PNM Controller application 406 can use the Explicit Call Transfer mechanism defined in 3GPP TS 24.173 to transfer the call (or session) to the PNM Controllee UE 104.

Alternatively, if PNM Controller UE 102 has a list for all the controllee UEs in its PNM, then the presence of the URI of the PNM Controllee UE 104 in the History-Info header can be used to determine that this is a PNM Controller application 406 related request as opposed to an ordinary call or call forwarding.

However, this has the disadvantage that it may not be possible for the PNM Controllee UE 104 to redirect or otherwise forward requests as these requests will also be treated as PNM Controller application 406 requests.

Furthermore, within the device there could be provisioned one or more PNM URIs lists. Within each list may be any number of URIs which are valid controllee URIs for that controller group. These lists could be provisioned via OMA DM, MBMS, cell broadcast SMS, USSD OTA, or via input mechanism on the device. The list of valid URIs could be stored on memory inside the device or external memory (U)SIM, Compact flash, MicroSD, memory stick, etc.

When a SIP INVITE is received with a TARGET SIP URI in the P-CALLED HEADER or Request URI (R-URI), the device will check the URI associated with the TARGET against the URIs provisioned in the PNM URI lists. If the URI appears in a URI list, the device will know which group this device should act as a PNM Controller UE. If the URI does not exist the device could:

1: reject the invite;

2: process the invite per a default PNM group; and/or

3: process the invite after subsequent input received via an input mechanism on the device.

In an embodiment of the disclosure, the format of the stored URI may be as follows:

| SIP URI (U)SIM format | | |
|---|---|---|
| Identifier: 'xxx' SFI: '04' | Structure: linear fixed | Mandatory |
| Record length: X bytes | | Update activity: low |
| Access Conditions: | | |
| READ | | PIN |
| UPDATE | | ADM |

| Bytes | Description | M/O | Length |
|---|---|---|---|
| | DEACTIVATE | ADM | |
| | ACTIVATE | ADM | |
| 1 to X | URI TLV data object | M | X bytes |

URI
Contents:
   SIP URI by which other parties know the subscriber.
Coding:
   For contents and coding of URI TLV data object values see IETF RFC 3261[16]. The tag value of the URI TLV data object shall be '80'.
OMA DM type
/<X>/PNM URI/
Occurrence: One
Format: chr
Access Types: Get, Replace
Values: <A PNM URI>
The format of the PNM URI is defined by 3GPP TS 23.003 [2].
For example, the format of the PNM URI, sip: domain.xfer@dtf1.home1.net, is as follows:

```
<Node>
    <NodeName> PNM URI </NodeName>
    <!-- The PNM URI node starts here. -->
    <DFProperties>
        <AccessType>
            <Get/>
            <Replace/>
        </AccessType>
        <DFFormat>
            <chr/>
        </DFFormat>
        <Occurrence>
            <One/>
        </Occurrence>
        <DFTitle>The PNM URI .</DFTitle>
        <DFType>
            <DDFName>
        </DFType>
    </DFProperties>
</Node>
```

The calls or sessions established or messages received using these mechanisms can be a voice call, a multimedia session, a messaging session, or any other media that can be established using SIP INVITE or other SIP Request. As well as SIP INVITE, the mechanisms defined here can also be used with SIP MESSAGE method.

The privacy service authorizes the call where the authorization is apart from normal authorization procedures involved in the network and requires real time consent from the user. All other supplementary features or other services may follow once this authorization is received.

While only one Controller UE and one controllee UE are depicted for ease of discussion, persons of ordinary skill in the art will recognize that any number of controller and controllee UEs may be present.

Figure 6:
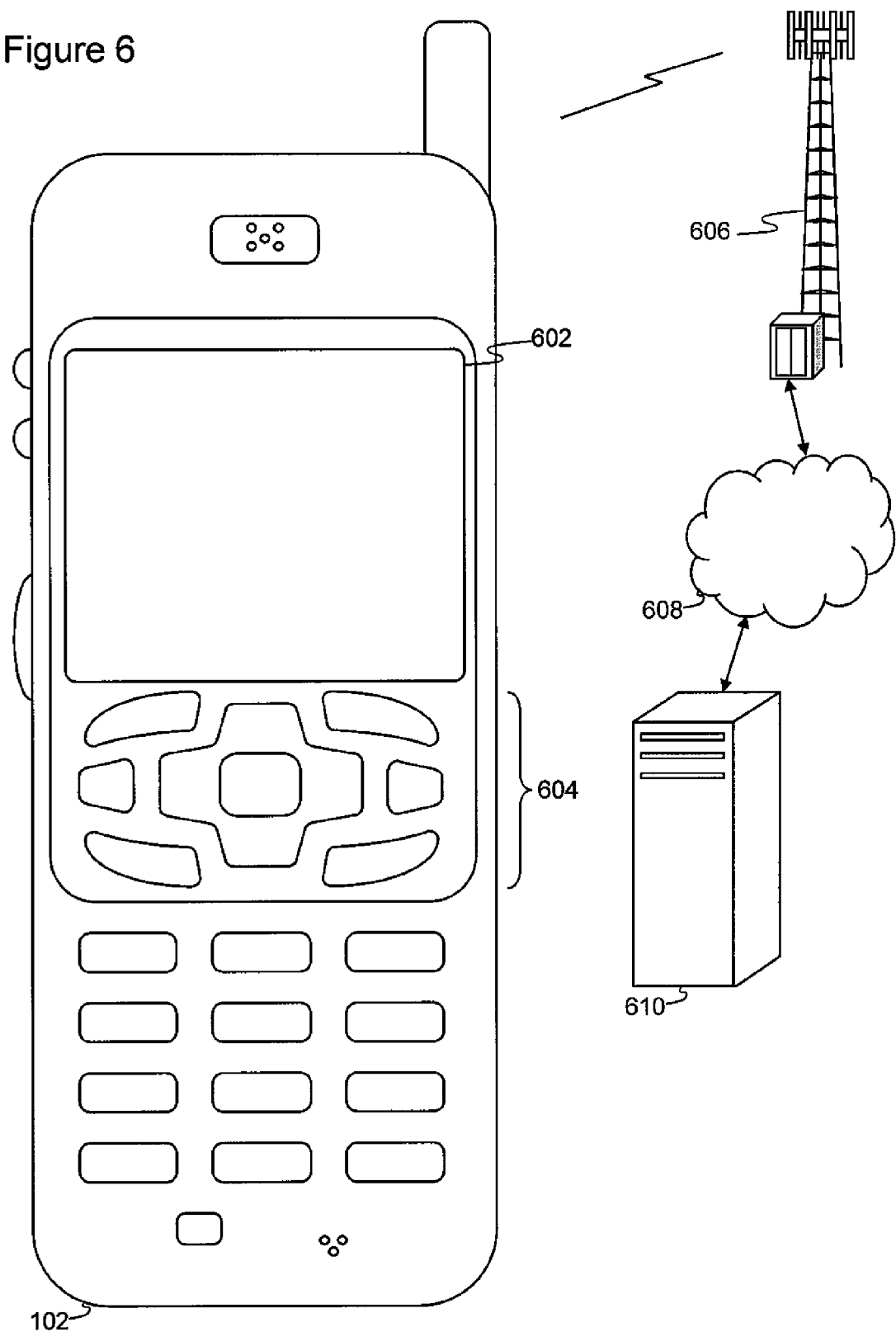
FIG. 6 is a diagram of a wireless communications system including user equipment operable for some of the various embodiments of the disclosure.

FIG. 6 illustrates a wireless communications system including an embodiment of the UE 102. The UE 102 is operable for implementing aspects of the disclosure, but the disclosure should not be limited to these implementations. Though illustrated as a mobile phone, the UE 102 may take various forms including a wireless handset, a pager, a personal digital assistant (PDA), a portable computer, a tablet computer, or a laptop computer, wireless or wired or fixed devices including standard wired telephone handset, set-top boxes, and the like. Many suitable devices combine some or all of these functions. In some embodiments of the disclosure, the UE 102 is not a general purpose computing device like a portable, laptop or tablet computer, but rather is a special-purpose communications device such as a mobile phone, wireless handset, pager, or PDA. In another embodiment, the UE 102 may be a portable, laptop or other computing device. The UE 102 may support specialized activities such as gaming, inventory control, job control, and/or task management functions, and so on.

The UE 102 includes a display 602. The UE 102 also includes a touch-sensitive surface, a keyboard or other input keys generally referred as 604 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UE 102 may present options for the user to select, controls for the user to actuate, and/or cursors or other indicators for the user to direct. The UE 102 may further accept data entry from the user, including numbers to dial or various parameter values for configuring the operation of the UE 102. The UE 102 may further execute one or more software or firmware applications in response to user commands. These applications may configure the UE 102 to perform various customized functions in response to user interaction. Additionally, the UE 102 may be programmed and/or configured over-the-air, for example from a wireless base station, a wireless access point, or a peer UE 102.

Among the various applications executable by the UE 102 are a web browser, which enables the display 602 to show a web page. The web page may be obtained via wireless communications with a wireless network access node, a cell tower, a peer UE 102, or any other wireless communication network or system. The network is coupled to a wired network 608, such as the Internet. Via the wireless link and the wired network, the UE 102 has access to information on various servers, such as a server 610. The server 610 may provide content that may be shown on the display 602. Alternately, the UE 102 may access the network through a peer UE 102 acting as an intermediary, in a relay type or hop type of connection.

Figure 7:
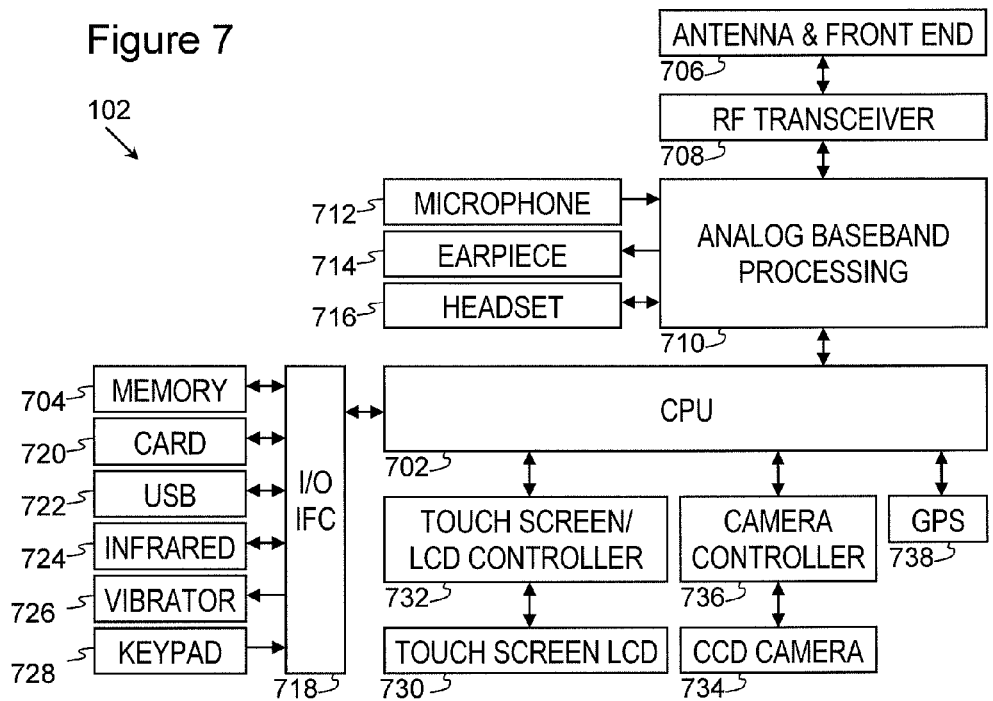
FIG. 7 is a block diagram of user equipment operable for some of the various embodiments of the disclosure.

FIG. 7 shows a block diagram of the UE 102. While a variety of known components of the UE 102 is depicted, in an embodiment a subset of the listed components and/or additional components not listed may be included in the UE 102. The UE 102 includes a central processing unit (CPU) 702 and a memory 704. As shown, the UE 102 may further include an antenna and front end unit 706, a radio frequency (RF) transceiver 708, an analog baseband processing unit 710, a microphone 712, an earpiece speaker 714, a headset port 716, an input/output interface 718, a removable memory card 720, a universal serial bus (USB) port 722, a short range wireless communication sub-system 724, an alert 726, a keypad 728, a liquid crystal display (LCD), which may include a touch sensitive surface 730, an LCD Controller 732, a charge-coupled device (CCD) camera 734, a Camera Controller 736, and a global positioning system (GPS) sensor 738. In an embodiment, the UE 102 may include another kind of display that does not provide a touch sensitive screen. In an embodiment, the CPU 702 may communicate directly with the memory 704 without passing through the input/output interface 718.

The CPU 702 or some other form of Controller or central processing unit operates to control the various components of the UE 102 in accordance with embedded software or firmware stored in memory 704 or stored in memory contained within the CPU 702 itself. In addition to the embedded software or firmware, the CPU 702 may execute other applications stored in the memory 704 or made available via information carrier media such as portable data storage media like the removable memory card 720 or via wired or wireless network communications. The application software may comprise a compiled set of machine-readable instructions that configure the CPU 702 to provide the desired functionality, or the application software may be high-level software instructions to be processed by an interpreter or compiler to indirectly configure the CPU 702.

The antenna and front end unit 706 may be provided to convert between wireless signals and electrical signals, enabling the UE 102 to send and receive information from a cellular network or some other available wireless communications network or from a peer UE 102. In an embodiment, the antenna and front end unit 706 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 706 may include antenna tuning and/or impedance matching components, RF power amplifiers, and/or low noise amplifiers.

The RF transceiver 708 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 710 and/or the CPU 702 or other central processing unit. In some embodiments, the RF Transceiver 708, portions of the Antenna and Front End 706, and the analog baseband processing unit 710 may be combined in one or more processing units and/or application specific integrated circuits (ASICs).

The analog baseband processing unit 710 may provide various analog processing of inputs and outputs, for example analog processing of inputs from the microphone 712 and the headset 716 and outputs to the earpiece 714 and the headset 716. To that end, the analog baseband processing unit 710 may have ports for connecting to the built-in microphone 712 and the earpiece speaker 714 that enable the UE 102 to be used as a cell phone. The analog baseband processing unit 710 may further include a port for connecting to a headset or other hands-free microphone and speaker configuration. The analog baseband processing unit 710 may provide digital-to-analog conversion in one signal direction and analog-to-digital conversion in the opposing signal direction. In some embodiments, at least some of the functionality of the analog baseband processing unit 710 may be provided by digital processing components, for example by the CPU 702 or by other central processing units.

The CPU 702 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the CPU 702 may perform modulation, coding, interleaving, and spreading, and for a receiver function the CPU 702 may perform despreading, deinterleaving, decoding, and demodulation. In another embodiment, for example in an orthogonal frequency division multiplex access (OFDMA) technology application, for the transmitter function the CPU 702 may perform modulation, coding, interleaving, inverse fast Fourier transforming, and cyclic prefix appending, and for a receiver function the CPU 702 may perform cyclic prefix removal, fast Fourier transforming, deinterleaving, decoding, and demodulation. In other wireless technology applications, yet other signal processing functions and combinations of signal processing functions may be performed by the CPU 702.

The CPU 702 may communicate with a wireless network via the analog baseband processing unit 710. In some embodiments, the communication may provide Internet connectivity, enabling a user to gain access to content on the Internet and to send and receive e-mail or text messages. The input/output interface 718 interconnects the CPU 702 and various memories and interfaces. The memory 704 and the removable memory card 720 may provide software and data to configure the operation of the CPU 702. Among the interfaces may be the USB interface 722 and the short range wireless communication sub-system 724. The USB interface 722 may be used to charge the UE 102 and may also enable the UE 102 to function as a peripheral device to exchange information with a personal computer or other computer system. The short range wireless communication sub-system 724 may include an infrared port, a Bluetooth interface, an IEEE 802.11 compliant wireless interface, or any other short range wireless communication sub-system, which may enable the UE 102 to communicate wirelessly with other nearby mobile devices and/or wireless base stations.

The input/output interface 718 may further connect the CPU 702 to the alert 726 that, when triggered, causes the UE 102 to provide a notice to the user, for example, by ringing, playing a melody, or vibrating. The alert 726 may serve as a mechanism for alerting the user to any of various events such as an incoming call, a new text message, and an appointment reminder by silently vibrating, or by playing a specific pre-assigned melody for a particular caller.

The keypad 728 couples to the CPU 702 via the interface 718 to provide one mechanism for the user to make selections, enter information, and otherwise provide input to the UE 102. The keyboard 728 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 730, which may include touch screen capability and also display text and/or graphics to the user. The LCD Controller 732 couples the CPU 702 to the LCD 730.

The CCD camera 734, if equipped, enables the UE 102 to take digital pictures. The CPU 702 communicates with the CCD camera 734 via the camera Controller 736. In another embodiment, a camera operating according to a technology other than Charge Coupled Device cameras may be employed. The GPS sensor 738 is coupled to the CPU 702 to decode global positioning system signals, thereby enabling the UE 102 to determine its position. Various other peripherals may also be included to provide additional functions, e.g., radio and television reception.

Figure 8:
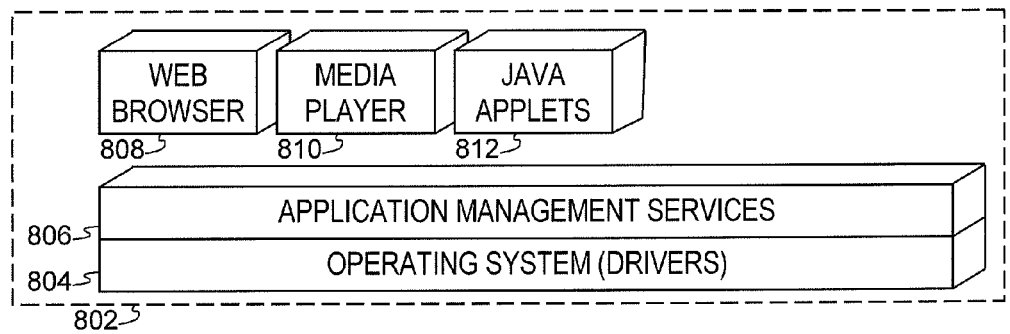
FIG. 8 is a diagram of a software environment that may be implemented on user equipment operable for some of the various embodiments of the disclosure.

FIG. 8 illustrates a software environment 802 that may be implemented by the CPU 702. The CPU 702 executes operating system drivers 804 that provide a platform from which the rest of the software operates. The operating system drivers 804 provide drivers for the UE hardware with standardized interfaces that are accessible to application software. The operating system drivers 804 include application management services ("AMS") 806 that transfer control between applications running on the UE 102. Also shown in FIG. 8 are a web browser application 808, a media player application 810, and Java applets 812. The web browser application 808 configures the UE 102 to operate as a web browser, allowing a user to enter information into forms and select links to retrieve and view web pages. The media player application 810 configures the UE 102 to retrieve and play audio or audiovisual media. The Java applets 812 configure the UE 102 to provide games, utilities, and other functionality.

Figure 9:
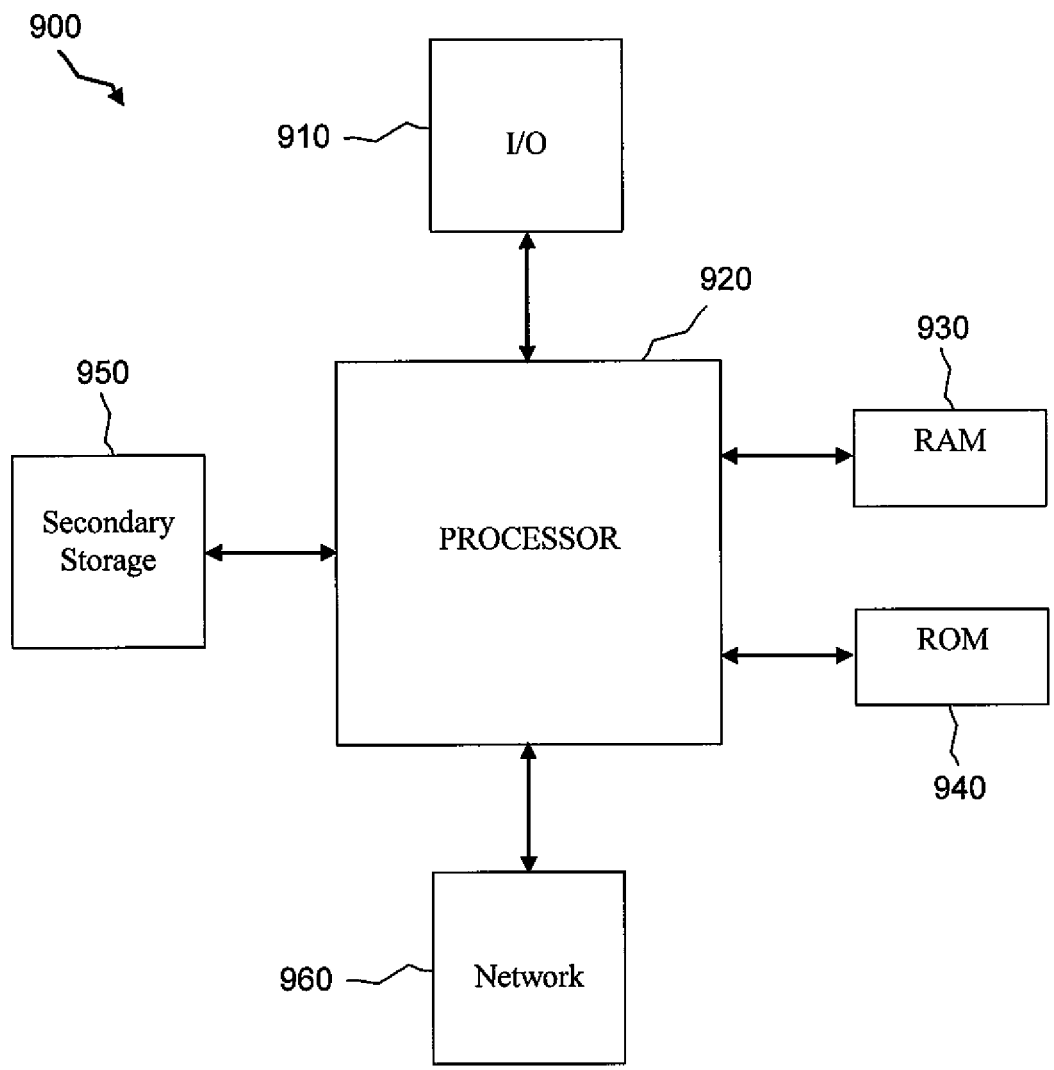
FIG. 9 is an illustrative general purpose computer system suitable for some of the various embodiments of the disclosure.

FIG. 9 illustrates a typical, general-purpose computer system 900 that may be suitable for implementing one or more embodiments disclosed herein. The computer system 900 includes a processor 920 (which may be referred to as a central processor unit or CPU) that is in communication with memory devices including secondary storage 950, read only memory (ROM) 940, random access memory (RAM) 930, input/output (I/O) devices 910, and network connectivity devices 960. The processor may be implemented as one or more CPU chips.

The secondary storage 950 is typically comprised of one or more disk drives or tape drives and is used for non-volatile storage of data and as an over-flow data storage device if RAM 930 is not large enough to hold all working data. Secondary storage 950 may be used to store programs which are loaded into RAM 930 when such programs are selected for execution. The ROM 940 is used to store instructions and perhaps data which are read during program execution. ROM 940 is a non-volatile memory device which typically has a small memory capacity relative to the larger memory capacity of secondary storage. The RAM 930 is used to store volatile data and perhaps to store instructions. Access to both ROM 940 and RAM 930 is typically faster than to secondary storage 950.

I/O devices 910 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 960 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 960 devices may enable the processor 920 to communicate with an Internet or one or more intranets. With such a network connection, it is contemplated that the processor 920 might receive information from the network, or might output information to the network in the course of performing the above-described method steps. Such information, which is often represented as a sequence of instructions to be executed using processor 920, may be received from and outputted to the network, for example, in the form of a computer data signal embodied in a carrier wave.

Such information, which may include data or instructions to be executed using processor 920 for example, may be received from and outputted to the network, for example, in the form of a computer data baseband signal or signal embodied in a carrier wave. The baseband signal or signal embodied in the carrier wave generated by the network connectivity 960 devices may propagate in or on the surface of electrical conductors, in coaxial cables, in waveguides, in optical media, for example optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 920 executes instructions, codes, computer programs, scripts which it accesses from hard disk, floppy disk, optical disk (these various disk based systems may all be considered secondary storage 950), ROM 940, RAM 930, or the network connectivity devices 960.

In traditional wireless telecommunications systems, transmission equipment in a base station transmits signals throughout a geographical region known as a cell. As technology has evolved, more advanced network access equipment has been introduced that can provide services that were not possible previously. This advanced network access equipment might include, for example, an enhanced node B (ENB) rather than a base station or other systems and devices that are more highly evolved than the equivalent equipment in a traditional wireless telecommunications system. Such advanced or next generation equipment may be referred to herein as long-term evolution (LTE) equipment. For LTE equipment, the region in which a wireless device can gain access to a telecommunications network might be referred to by a name other than "cell", such as "hot spot". As used herein, the term "cell" will be used to refer to any region in which a wireless device can gain access to a telecommunications network, regardless of whether the wireless device is a traditional cellular device, an LTE device, or some other device.

Devices that might be used by users in a telecommunications network can include both mobile terminals, such as mobile telephones, personal digital assistants, handheld computers, portable computers, laptop computers, tablet computers and similar devices, and fixed terminals such as residential gateways, televisions, set-top boxes and the like. Such devices will be referred to herein as user equipment or UE.

A group of LTE-based cells might be under the control of a single entity known as a central control. The central control typically manages and coordinates certain activities with a group of cells such as the scheduling of transmissions and the control of a modulation and coding scheme for the cells. The modulation and coding schemes might include binary phase-shift keying (BPSK), quadrature phase-shift keying (QPSK), quadrature amplitude modulation (QAM), or other schemes that will be familiar to one of skill in the art.

Services that might be provided by LTE-based equipment can include broadcasts or multicasts of television programs, streaming video, streaming audio, and other multimedia content. Such services are commonly referred to as multimedia broadcast multicast services (MBMS). An MBMS might be transmitted throughout a single cell or throughout several contiguous or overlapping cells. A set of cells receiving an MBMS can be referred to as a service area. A service area and a region under the control of a central control do not necessarily coincide. For example, a central control might specify that a first subset of cells under its control will deliver a first MBMS and that a second subset of cells under its control will deliver a second MBMS.

When multiple cells overlap, a UE within the overlapped region can receive transmissions from multiple ENBs. It is well known in the art that when a UE receives substantially identical data from a plurality of ENBs, the transmissions from the ENBs can augment one another to provide a signal of significantly higher quality than would be the case if only one ENB were transmitting the signal. That is, a higher signal-to-noise ratio can be achieved when substantially the same data is transmitted at substantially the same time on substantially the same resource with substantially the same modulation and coding. A region in which a plurality of substantially identical signals are present is known as a single frequency network, or SFN. In the case where all of the ENBs in a service area are transmitting an MBMS with substantially identical signals, the service area can be referred to a multicast/broadcast SFN (MBSFN).

FIG. 10 illustrates an exemplary cellular network 1000 according to an embodiment of the disclosure. The cellular network 1000 may include a plurality of cells $1002_1$, $1002_2$, $1002_3$, $1002_4$, $1002_5$, $1002_6$, $1002_7$, $1002_8$, $1002_9$, $1002_{10}$, $1002_{11}$, $1002_{12}$, $1002_{13}$, and $1002_{14}$ (collectively referred to as cells 1002). As is apparent to persons of ordinary skill in the art, each of the cells 1002 represents a coverage area for providing cellular services of the cellular network 1000. While the cells 1002 are depicted as having non-overlapping coverage areas, persons of ordinary skill in the art will recognize that one or more of the cells 1002 may have partially overlapping coverage with adjacent cells. Further, while a particular number of the cells 1002 are depicted, persons of ordinary skill in the art will recognize that a larger or smaller number of the cells 1002 may be included in the cellular network 1000.

One or more UEs 10 may be present in each of the cells 1002. Although only one UE 10 is depicted and is shown in only one cell $1002_{12}$, it will be apparent to one of skill in the art that a plurality of UEs 10 might be present in each of the cells 1002. An ENB 20 in each of the cells 1002 performs functions similar to those of a traditional base station. That is, the ENBs 20 provide a radio link between the UEs 10 and other components in a telecommunications network. While the ENB 20 is shown only in cell $1002_{12}$, it should be understood that an ENB would be present in each of the cells 1002. Also, radio links other than the ENBs 20 could be used. A central control 1010 oversees the wireless data transmissions within the cells 1002 by providing centralized management and coordination for the cells 1002 and their corresponding ENBs 20.

In the present disclosure, the cellular systems or cells 1002 are described as engaged in certain activities, such as transmitting signals; however, as will be readily apparent to one skilled in the art, these activities would in fact be conducted by components comprising the cells. As an example, FIG. 11 depicts a more detailed view of the cell $1002_{12}$. The ENB 20 in cell $1002_{12}$ can promote communication via a transmitter 27, a receiver 29, and/or other well known equipment. Similar equipment might be present in the other cells 1002. A plurality of UEs 10 are present in the cell $1002_{12}$, as might be the case in the other cells 1002.

The following references are hereby incorporated by reference for all purposes:
[RFC 3261] SIP: Session Initiation Protocol, [RFC 4244] An Extension to the Session Initiation Protocol (SIP) for Request History Information, [RFC 3326] The Reason Header Field for the Session Initiation Protocol (SIP), [RFC 4458] Session Initiation Protocol (SIP) URIs for Applications such as Voicemail and Interactive Voice Response (IVR), [RFC 3840] Indicating User Agent Capabilities in the Session Initiation Protocol (SIP), [RFC 3841] Caller Preferences for the Session Initiation Protocol (SIP), [3GPP TS 22.259], [3GPP TS 23.259], [3GPP TS 24.259], [3GPP TS 24.173], and Applying Loose Routing to Session Initiation Protocol (SIP) User Agents (UA) draft-rosenberg-sip-ua-loose-route-01, Target URI delivery in the Session Initiation Protocol (SIP) draft-holmberg-sip-target-uri-delivery-00.txt.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A server device of a personal network, comprising:
a transceiver configured to receive a first Session Initiation Protocol (SIP) request containing a first Request Uniform Resource Identifier (Request-URI) identifying a first user equipment (UE), the first UE being a personal network management (PNM) controlee UE; and
a processor configured to, upon receipt of the first SIP request, create a second SIP request for sending to a second UE, the second UE being a PNM controller UE;
wherein the first SIP request is received from a third UE that is not a member of the same personal network as the first UE, and
wherein the second SIP request comprises a second Request URI, the second Request URI comprising both the Uniform Resource Identifier (URI) of the second UE and a target URI parameter set to a URI from the first Request-URI of the first SIP request, and
wherein the transceiver is further configured to send the second SIP request which further comprises an "Accept Contact" header containing a feature tag that is a PNM controller indication,
wherein the transceiver is further configured to receive a response from the second user device, the response selected from one of the response indicating that a session or call be redirected to the first user device, a response indicating rejection, or a response indicating acceptance by the second user device, and wherein the response indicating that the session or call be redirected is 302 (Moved Temporarily) response, wherein the response indicating rejection is a 480 (Temporarily Unavailable) response, and where the response indicating acceptance is a 200 (OK) response.

2. The server device of claim 1, wherein the first SIP request is from a third device that is not on a personal network access control list.

3. The server device of claim 1, wherein the processor is further configured to direct the session or call to the first user device when the response comprises the 302 (Moved Temporarily) response.

4. The server device of claim 1, wherein the processor is further configured to forward the response to the third device when the response comprises the 200 (OK) response, the third device not being a member of the personal network or not being on a personal network access control list.

5. The server device of claim 1, wherein the PNM controller indication comprises an IMS Application Reference Identifier (IARI) value including "3gpp-application.ims.iari.PNM-Controller".

6. A non-transitory computer readable medium storing instructions which are configured to cause a server device to execute a method comprising the operations of:

receiving a first Session Initiation Protocol (SIP) request containing a first Request Uniform Resource Identifier (Request-URI) identifying a first user equipment (UE), the first UE being a personal network management (PNM) controlee UE;

creating a second SIP request for sending to a second UE to invoke a personal network controller function of the second UE, the second UE being a PNM controller UE and sending the second SIP request to the second user device, wherein the first SIP request is received from a third UE that is not a member of the same personal network as the first UE, wherein the second SIP request comprises a second Request URI, the second Request URI comprising both a Uniform Resource Identifier (URI) of the second UE and a target URI parameter set to a URI from the first Request-URI of the first SIP request, and further comprises an "Accepted Contact" header containing a feature tag that is PNM controller indication, receiving a response from the second user device, the response selected from one of a response indicating that a session or call be redirected to the first user device, a response indicating rejection, or a response indicating acceptance by the second user device, wherein the response indicating that the session or call be redirected is a 302 (Moved Temporarily) response, wherein the response indicating rejection is a 480 (Temporarily Unavailable) response, and wherein the response indicating acceptance is a 200 (OK) response.

7. The non-transitory computer readable medium of claim 6, wherein the first SIP request is from a third device that is not on a personal network access control list.

8. The non-transitory computer readable medium of claim 6, wherein the instructions are further configured to cause the session or call to be directed to the first user device when the response comprises the 302 (Moved Temporarily) response.

9. The non-transitory computer readable medium of claim 6, wherein the instructions are further configured to cause forwarding of the response to the third device when the response comprises the 200 (OK) response.

10. The non-transitory computer readable medium of claim 6, wherein the PNM controller indication comprises an IMS Application Reference Identifier (IARI) value including "3gpp-application.ims.iari.PNM-Controller".

* * * * *

UNITED STATES PATENT AND TRADEMARK OFFICE
CERTIFICATE OF CORRECTION

PATENT NO. : 8,855,103 B2  
APPLICATION NO. : 12/016167  
DATED : October 7, 2014  
INVENTOR(S) : Andrew Allen et al.

Page 1 of 1

It is certified that error appears in the above-identified patent and that said Letters Patent is hereby corrected as shown below:

In the Claims,

Claim 1, Column 29, Line 2, replace "is 302" with --is a 302--

Claim 1, Column 29, Line 4, replace "where" with --wherein--

Signed and Sealed this  
Twentieth Day of January, 2015

Michelle K. Lee  
*Deputy Director of the United States Patent and Trademark Office*